United States Patent
Rubin

(10) Patent No.: US 11,737,607 B2
(45) Date of Patent: Aug. 29, 2023

(54) COOKING UTENSIL WITH SEASONING GRINDER INTEGRATED INTO THE HANDLE

(71) Applicant: Edward Scott Rubin, Sherman Oaks, CA (US)

(72) Inventor: Edward Scott Rubin, Sherman Oaks, CA (US)

(*) Notice: Subject to any disclaimer, the term of this patent is extended or adjusted under 35 U.S.C. 154(b) by 183 days.

(21) Appl. No.: 17/246,260

(22) Filed: Apr. 30, 2021

(65) Prior Publication Data

US 2022/0257059 A1    Aug. 18, 2022

Related U.S. Application Data

(60) Provisional application No. 63/150,067, filed on Feb. 16, 2021.

(51) Int. Cl.
*A47J 43/04* (2006.01)
*A47J 43/28* (2006.01)
*A47J 43/044* (2006.01)

(52) U.S. Cl.
CPC ........... *A47J 43/281* (2013.01); *A47J 43/044* (2013.01); *A47J 2043/04409* (2013.01)

(58) Field of Classification Search
CPC . A47J 42/34; A47J 43/281; A47J 2043/04409
See application file for complete search history.

(56) References Cited

U.S. PATENT DOCUMENTS

| | | |
|---|---|---|
| 149,833 A | 4/1874 | Brown et al. |
| 1,661,595 A | 3/1928 | Brown |
| 2,650,425 A * | 9/1953 | Brandel ................ A47J 43/281 30/325 |
| 2,953,170 A | 9/1960 | Bush |
| 3,004,341 A * | 10/1961 | Carroll ................. A47J 43/288 294/7 |
| 3,113,703 A * | 12/1963 | Rundle ................. A47J 43/288 222/191 |
| 3,410,457 A | 11/1968 | Brown |

(Continued)

FOREIGN PATENT DOCUMENTS

WO    WO 2005/065498    7/2005

*Primary Examiner* — Faye Francis
(74) *Attorney, Agent, or Firm* — Makoui Law, PC; Ali Makoui

(57) ABSTRACT

A cooking article includes a cooking utensil and a handle that is removably connected to the cooking utensil. The handle includes a plurality of hollow seasoning compartment sections, each section configured to store grindable seasonings. The handle includes a selector switch configured to select one of the plurality of seasoning compartment sections for grinding and dispensing seasonings. The handle includes a plurality of sliding members. Each sliding member is associated with a corresponding seasoning compartment section and includes one or more grinding teeth configured to grind the grindable seasonings of the associated seasoning compartment section. The handle includes a lever configured to be pressed and released. When the lever is pressed and released, the lever moves the sliding member associated with the selected seasoning compartment section back and forth, causing the sliding member's grinding teeth to grind the grindable seasonings in the selected seasoning compartment section.

20 Claims, 17 Drawing Sheets

(56) References Cited

U.S. PATENT DOCUMENTS

| | | | |
|---|---|---|---|
| 3,612,358 A * | 10/1971 | Massa | A61J 7/0046 |
| | | | 222/441 |
| 4,343,437 A | 8/1982 | Czelen | |
| 4,573,244 A | 3/1986 | Holcomb et al. | |
| 4,825,551 A * | 5/1989 | Sherblom | A47J 43/281 |
| | | | 30/325 |
| 4,841,637 A | 6/1989 | Scholzen | |
| 4,888,188 A | 12/1989 | Castner, Sr. et al. | |
| 4,957,226 A * | 9/1990 | Pacia | A47G 21/08 |
| | | | 401/266 |
| 5,014,434 A * | 5/1991 | Skerker | H05B 6/64 |
| | | | 294/7 |
| 5,465,871 A | 11/1995 | Robbins, III | |
| 5,601,213 A | 2/1997 | Daniello | |
| 5,873,167 A | 2/1999 | Mason | |
| 6,125,489 A * | 10/2000 | Zeller | B26B 11/00 |
| | | | 7/106 |
| 6,601,734 B1 | 8/2003 | Smith | |
| 6,616,075 B1 | 9/2003 | Millerd | |
| 6,871,808 B2 | 3/2005 | Holcomb et al. | |
| 6,928,870 B1 | 8/2005 | Liebowitz | |
| 7,003,833 B2 * | 2/2006 | Feliciano | B25F 1/04 |
| | | | 30/155 |
| D524,125 S | 7/2006 | Kushner | |
| 7,451,901 B2 | 11/2008 | Ranney | |
| 8,051,570 B1 | 11/2011 | Brown | |
| 8,607,459 B2 | 12/2013 | Geissler | |
| 8,689,453 B2 * | 4/2014 | Vogan | A47J 43/281 |
| | | | 30/142 |
| 10,039,399 B2 * | 8/2018 | Cunningham | A47G 21/181 |
| 2006/0201972 A1 | 9/2006 | Di Paolo | |
| 2007/0080176 A1 | 4/2007 | Hunter | |
| 2008/0072432 A1 | 3/2008 | Teys | |
| 2008/0229585 A1 * | 9/2008 | Kelly | A47J 43/281 |
| | | | 30/142 |
| 2009/0039188 A1 | 2/2009 | Robbins | |
| 2009/0121062 A1 * | 5/2009 | Silver | A47J 43/25 |
| | | | 241/168 |
| 2009/0217532 A1 | 9/2009 | Cantu | |
| 2012/0153060 A1 | 6/2012 | Ng | |
| 2013/0312268 A1 * | 11/2013 | Vogan | A47J 43/281 |
| | | | 30/142 |
| 2015/0093480 A1 | 4/2015 | Biever | |

* cited by examiner

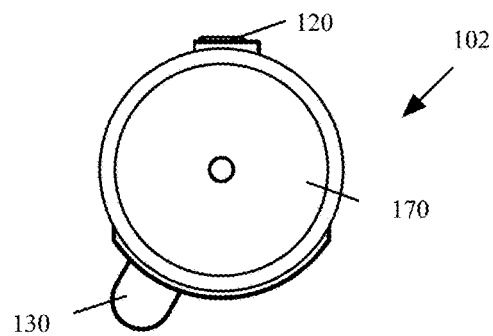
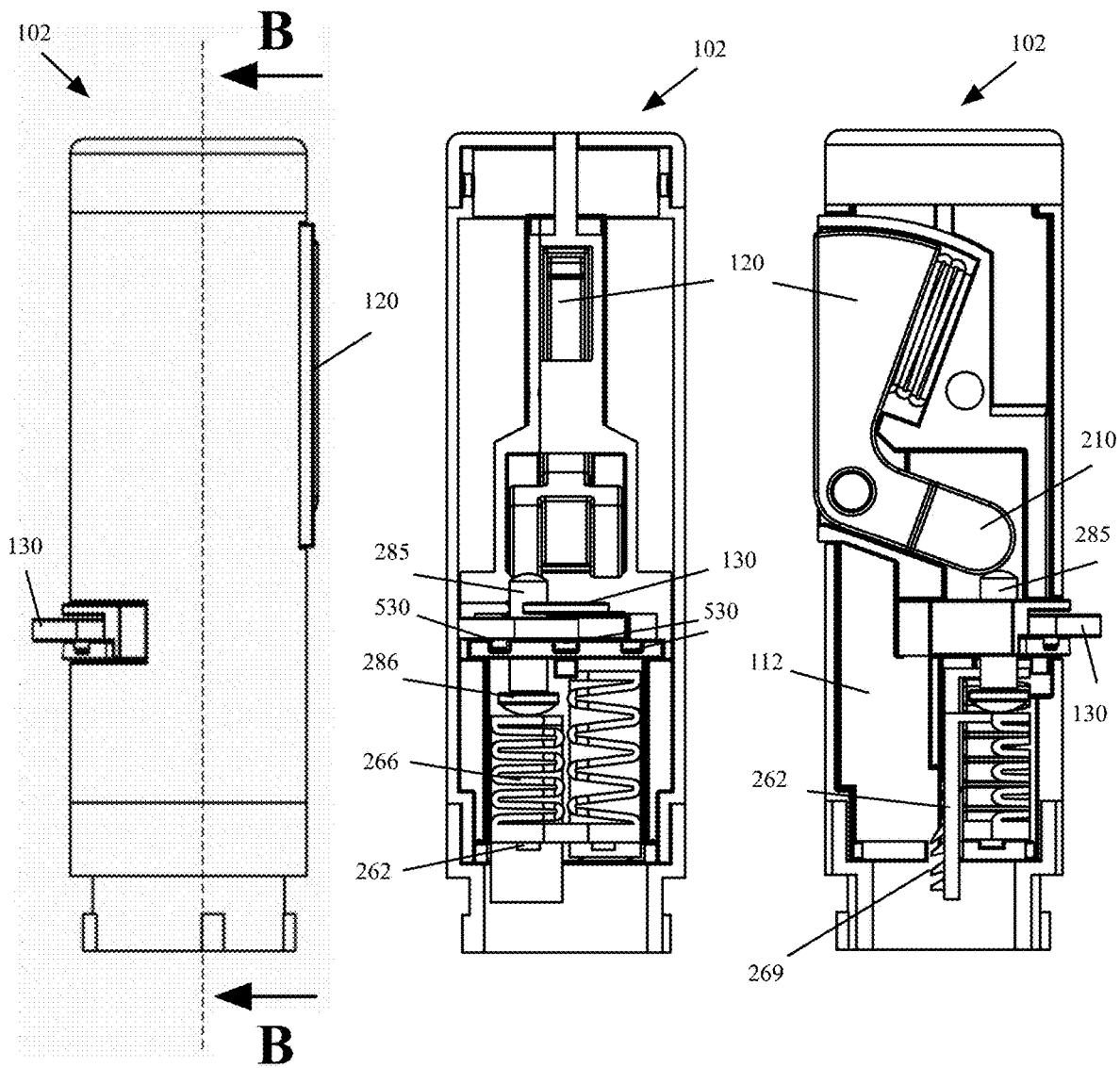
FIG. 9A
FIG. 9B    FIG. 9C    FIG. 9D

COOKING UTENSIL WITH SEASONING GRINDER INTEGRATED INTO THE HANDLE

CLAIM OF BENEFIT TO PRIOR APPLICATIONS

This application claims the benefit of U.S. Provisional Patent Application Ser. No. 63/150,067, filed on Feb. 16, 2021. The contents of U.S. Provisional Patent Application 63/150,067 are hereby incorporated by reference.

BACK GROUND

Kitchen utensils are handheld tools used for cooking. Examples of kitchen utensils include spoons, slotted spoons, forks, spatulas, ladles, spaghetti ladles, whisks, potato mashers, skimmers, basting brushes, tongs, etc. Kitchen utensils may be made of one or more of plastic, metal, glass, silicone, nylon, wood, ceramic, etc. It is often desirable to grind whole spices and seasonings to season the food at the same time as a utensil is being used to prepare the food. The grindable seasonings may include salt, pepper, rosemary, turmeric, oregano, fennel seeds, cinnamon, cloves, star anise, cumin, coriander, achiote, bay leaves, fenugreek dried ginger, cardamom pods, etc.

A person who wishes to grind whole seasonings over food while using a utensil, has to put the utensil down, grind the seasonings over the food and pick up the utensil again. Repeating this procedure may be time consuming and inconvenient. The desired seasonings may have to be found in the kitchen or in the pantry. For outdoor grilling and cooking, the desired seasonings have to be carried from the kitchen or from a storage area to an outdoor area such as backyard, park, campsite, etc.

BRIEF DESCRIPTION OF THE DRAWINGS

The various embodiments of the present cooking utensil with seasoning grinder integrated into the handle now will be discussed in detail with an emphasis on highlighting the advantageous features. These embodiments depict the novel and non-obvious cooking utensil with seasoning grinder integrated into the handle shown in the accompanying drawings, which are for illustrative purposes only. These drawings include the following figures, in which like numerals indicate like parts:

FIG. 9A is the top view, FIG. 9B is a left elevation view, and FIGS. 9C-9D are cross section views of a cooking utensil handle showing the selector switch set to select a seasoning compartment sections for grinding and dispensing seasonings, according to various aspects of the present disclosure;

DETAILED DESCRIPTION

Figure 1A:
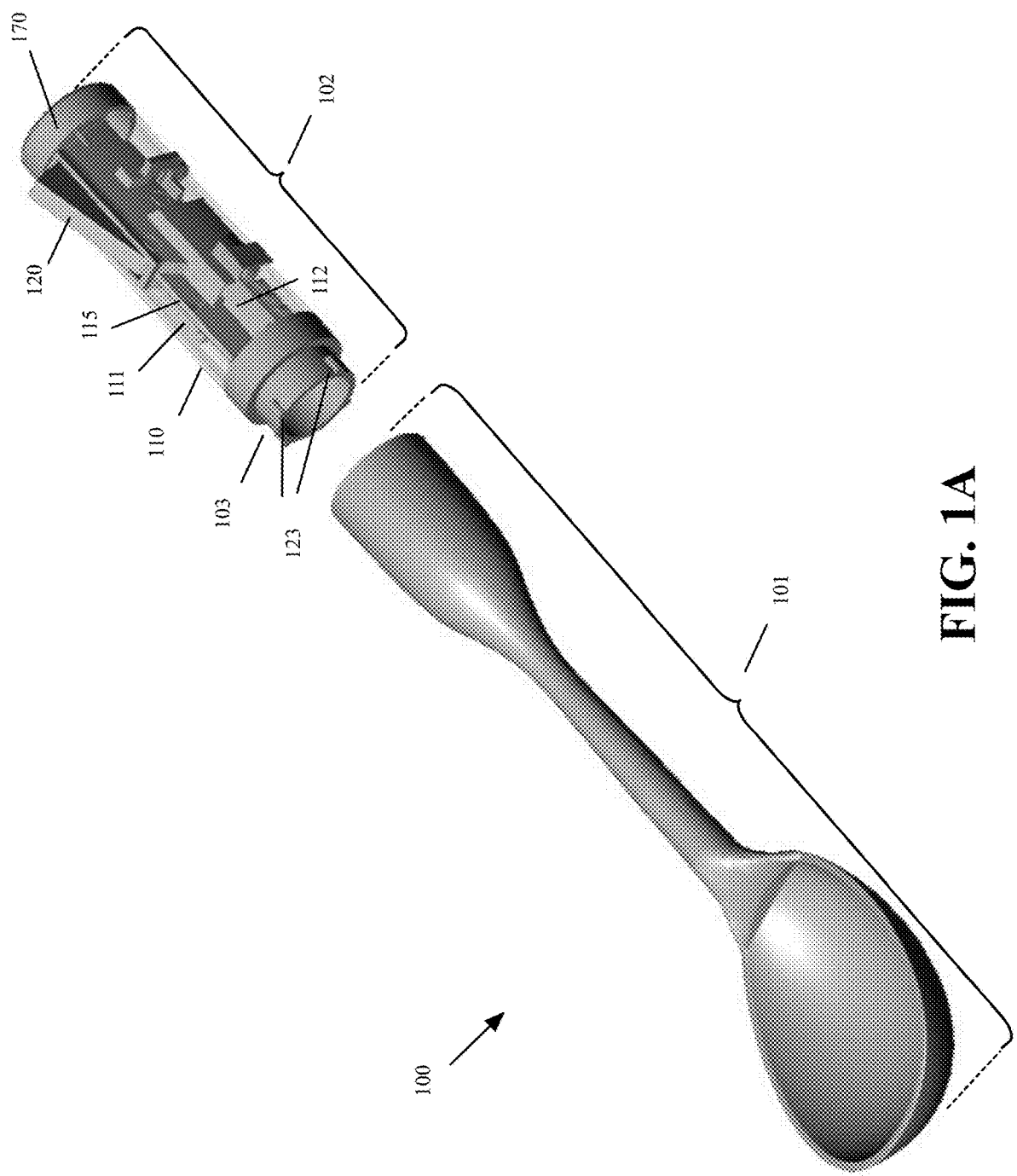
FIG. 1A is a front and side perspective view of a cooking article that includes a cooking utensil with a removable handle that includes one or more seasoning grinders, according to various aspects of the present disclosure.

One aspect of the present embodiments includes the realization that simultaneous use of the existing cooking utensils and seasonings grinders with one hand may not be practical. When a person is using an existing cooking utensil for cooking food, mixing salad, mixing the food ingredients, picking or turning food items, the person has to use both hands for using the cooking utensil and a seasoning dispenser. When the seasoning dispenser is a grinder, the person may typically have to put down the utensil, use the grinder with both hands, and then pick up the utensil to continue food preparation. Repeating this procedure may be time consuming and inconvenient. In addition, the person may have to search and find the desired seasonings in the kitchen or in a pantry. For outdoor cooking and grilling, the desired seasonings have to be carried from the kitchen or from a storage area to an outdoor area such as backyard, park, campsite, etc.

The present embodiments, as described in detail below, solve the above-mentioned problems by providing a cooking utensil with one or more seasoning grinders integrated into the handle of the cooking utensil. The cooking utensil may be, for example, and without limitations, a spoon, a slotted spoon, a fork, a spatula, a ladle, a spaghetti ladle, a whisk, a potato masher, a skimmer, a basting brush, a tong, etc. Depending on the type of food preparation, a person may detach the cooking utensil from the handle and may attach another cooking utensil with grindable seasonings that may be appropriate for the food preparation task that is performed by the person.

The handle, in some embodiments, may be replaceable. For example, a handle with one or more seasoning compartment sections may be replaced by a handle with a different number of seasoning compartment sections and/or with a handle that has different seasonings in the seasoning compartment sections, in order to fit the needs of a particular food preparation task. In some of these embodiments, the handle may be discarded once the seasonings in the handle are dispensed.

The handle, in some embodiments, may include one or more hollow sections for storing grindable seasonings. In some embodiments, each seasoning section may be filled with one or more grindable seasonings. Each hollow section may be pre-filled with one or more grindable seasonings. The handle may include a selector switch in order to select one of the seasoning sections. The handle may include a lever that may repeatedly be pressed and released in order to grind seasonings in the selected seasoning compartment section.

Instead of handles that are discarded after the pre-filled seasonings are dispensed, some embodiments may include handles with replaceable cartridges. In these embodiments, the handle may include one or more replaceable cartridges configured to store grindable seasonings. Each replaceable cartridge may be pre-filled by one or more grindable seasonings and may be inserted into a corresponding empty seasoning compartment section. The handle may include a selector switch in order to select one of the replaceable cartridges for grinding and dispensing seasonings. Once the seasonings in a cartridge are dispensed, instead of discarding the handle, the empty cartridge may be discarded and another cartridge that is pre-filled with seasonings may be inserted in the corresponding seasoning compartment section.

The handle may include one or more movable sliding members. Each sliding member may be located in one of the seasoning compartment sections. Each sliding member may include a corresponding grinding surface that may be covered with a plurality of teeth (or serrations) for grinding seasonings. The grinded seasonings may be dispensed through one or more dispensing channels that dispense the grinded seasonings through one or more dispensing openings on the cooking utensil.

The remaining detailed description describes the present embodiments with reference to the drawings. In the drawings, reference numbers label elements of the present embodiments. These reference numbers are reproduced below in connection with the discussion of the corresponding drawing features.

Figure 1B:
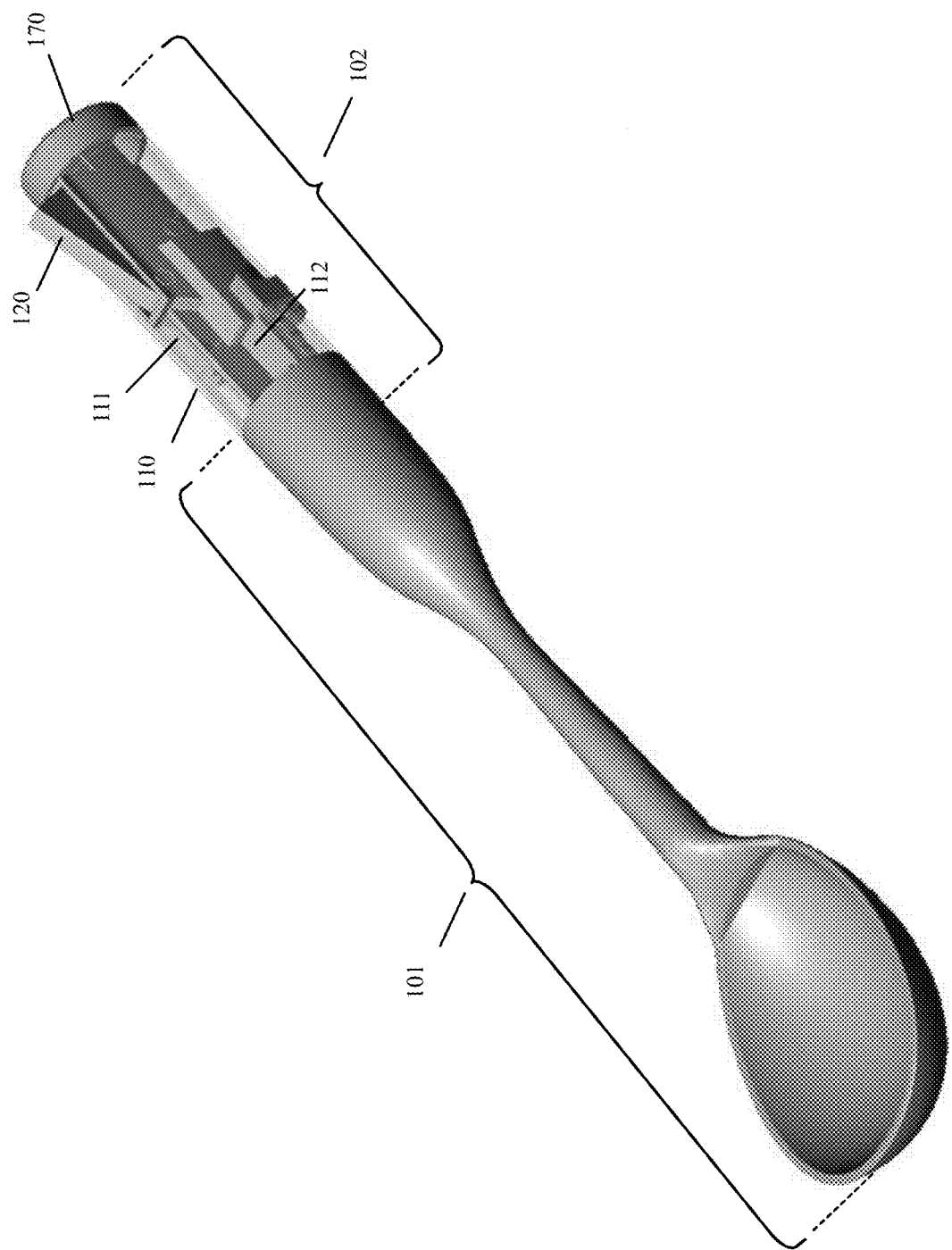
FIG. 1B is a front and side perspective view of the cooking article of FIG. 1A after the cooking utensil and the handle are connected together, according to various aspects of the present disclosure.
Figure 1C:
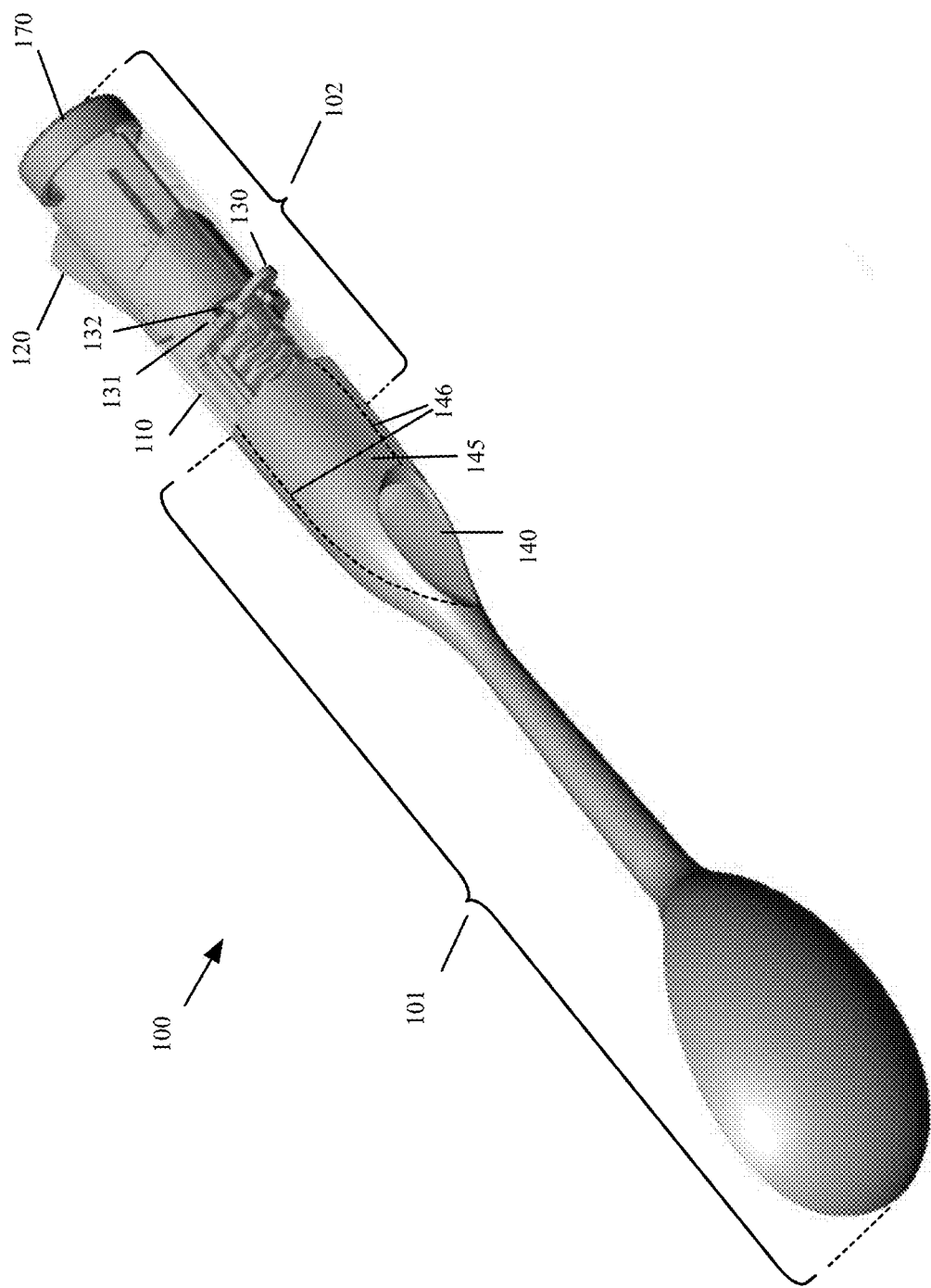
FIG. 1C is a back and side perspective view of the cooking article of FIG. 1B, according to various aspects of the present disclosure.

Some of the present embodiments provide a cooking article that includes a cooking utensil with one or more seasoning grinders (also referred to herein as spice grinders) integrated into a removable handle. FIG. 1A is a front and side perspective view of a cooking article that includes a cooking utensil with a removable handle that includes one or more seasoning grinders, according to various aspects of the present disclosure. FIG. 1B is a front and side perspective view of the cooking article of FIG. 1A after the cooking utensil and the handle are connected together, according to various aspects of the present disclosure. FIG. 1C is a back and side perspective view of the cooking article of FIG. 1B, according to various aspects of the present disclosure.

With reference to FIGS. 1A-1C, the cooking article 100 may include a cooking utensil 101 and a handle 102. The cooking utensil 101 and the handle 102 may be attached to each other, and detached from each other, by a connector 103 (FIG. 1A). The connector 103, in some embodiments, may be a twist and snap type of connector. The connector may include a set of one or more tabs 123 that may be aligned with a set of corresponding grooves (not shown) inside the cooking utensil 101. The handle may then be turned in one direction (e.g., clockwise) to lock. The handle may be turned in the opposite direction (e.g., counterclockwise) to unlock.

In the example embodiments of FIG. 1A, the connector 103 is shown as a part of the handle 102. In other embodiments, the connector 103 may be a part of the cooking utensil 101. In these embodiments, the handle may include a set of grooves to fit a corresponding set of tabs on the connector. Yet, in other embodiments, the connector 103 may be a separate component that may be removably attached to the cooking utensil 101 on one side and removably attached to the handle 102 on the other side.

With further reference to FIGS. 1A-1C, the cooking utensil 101 may be, for example, and without limitations, a spoon (as shown), a slotted spoon, a fork, a spatula, a ladle, a spaghetti ladle, a whisk, a potato masher, a skimmer, a basting brush, a tong, etc. Depending on the type of food preparation, a person may detach the cooking utensil 101 from the handle 102 and may attach another cooking utensil that may be appropriate for the food preparation task performed by the person.

The handle 102 may include a seasoning compartment 110. The seasoning compartment 110 may include one or more hollow seasoning compartment sections 111-112 for storing grindable seasonings. The seasonings may be, for example, and without limitations, seeds, buds, fruits, flowers, bark, and roots of plants. The grindable seasonings may be, for example, and without limitations, mineral or crystals, such as table salt, sea salt, etc. The grindable seasonings may include, for example, and without limitations, salt, pepper, rosemary, turmeric, oregano, fennel seeds, cinnamon, cloves, star anise, cumin, coriander, achiote, bay leaves, fenugreek, dried ginger, cardamom pods, nutmeg seeds, etc. The terms seasoning and spice are used interchangeably in this specification.

The handle 102 may include a lever (or actuator) 120 that may repeatedly be pressed (i.e., pushed in towards the housing of the handle) and released in order to grind seasonings in the seasoning compartment 110. The seasoning compartment 110, in some embodiments, may include a transparent external surface to show the seasonings in the seasoning compartment sections 111-112. For example, and without limitations, the exterior of the seasoning compartment 110 may be covered by glass, transparent plastic, or other transparent material. In other embodiments, the handle's external surface may be opaque.

In the embodiments that the seasoning compartment 110 includes more than one seasoning compartment section, two adjacent seasoning compartment sections 111 and 112 may be separated by a divider 115. The handle 102 may include a selector switch 130 (FIG. 1C) configured to select one of the seasoning compartment sections 111-112 for grinding and dispensing the seasonings. The grinded seasonings may be dispensed through at least one dispensing channel 145 and one or more dispensing openings (or dispensing holes) 140 (FIG. 1C). The embodiment of FIG. 1C has only one dispensing channel 145 (shown by the dotted lines 146) and one dispensing opening 140.

As shown in FIG. 1C, a section of the dispensing channel 145 may be inside the handle 102 and a section of the dispensing channel 145 may be inside the cooking utensil 101. Both sections of the dispensing channel 145 become a continuous channel after the cooking utensil 101 and the handle 102 are connected to each other. It should be noted that in FIGS. 1B and 1C, the handle and the cooking utensil are connected together by the connector 103 of FIG. 1A. Therefore, there is an overlap between the cooking utensil 101 and the handle 102 in FIGS. 1B and 1C where the dispensing channel 145 is located.

The selector switch 130, in some embodiments, may be a thumb switch with several positions. Each position may correspond to selecting one of the plurality of the seasoning compartment sections 111-112. As a non-limiting example, when the seasoning compartment 110 includes two seasoning sections, one section for storing grindable salt and another section for storing grindable pepper, the selector switch 130 may have two positions: one position for selecting the salt section and another position for selecting the pepper section. The selector switch 130 and the multiple sections of the seasoning compartment 110 provide the technical advantage of using one lever 120 for grinding and dispensing multiple seasonings without the need to grab individual grinders for different seasonings. In addition to the positions for selecting one of the seasoning compartment sections, the selector switch 130, in some embodiments, may have a neutral position. In these embodiments, when the selector switch is at the neutral position, no seasonings are grinded even if the lever 120 is pressed and released.

The selector switch 130 may include a housing 131 (FIG. 1C) with an opening 132 for the selector switch 130 to move to different positions. The handle 102 may include an end cap 170. The handle 102, in some embodiments, may be replaceable. For example, a handle with one or more seasoning compartment sections may be replaced by a handle with a different number of seasoning compartment sections and/or by a handle that has different seasonings in the seasoning compartment sections, in order to fit the needs of a particular food preparation task.

In some of embodiments, the handle may be pre-filled with seasonings and the handle may be discarded once the seasonings in the handle are dispensed. In these embodiments, once the seasonings in a handle are dispensed, the handle is replaced with another handle that is pre-filled with seasonings. Instead of handles that are discarded after the pre-filled seasonings are dispensed, some embodiments may include handles with replaceable cartridges. In these embodiments, the handle may include one or more replaceable cartridges configured to store grindable seasonings. Each replaceable cartridge may be pre-filled by one or more grindable seasonings and may be inserted into a corresponding empty seasoning compartment section.

The cooking utensil 101 and the handle 102 may be made of appropriate material for different cooking applications such as, for example, and without limitations, preparing salads, cooking hot meals, mixing cooking ingredients, grilling and barbecuing, picking and turning food items, etc. For example, and without limitations, the cooking utensil 101 and the handle 102 may be made from one or more of plastic, metal, glass, silicone, nylon, wood, ceramic, etc.

Figure 2:
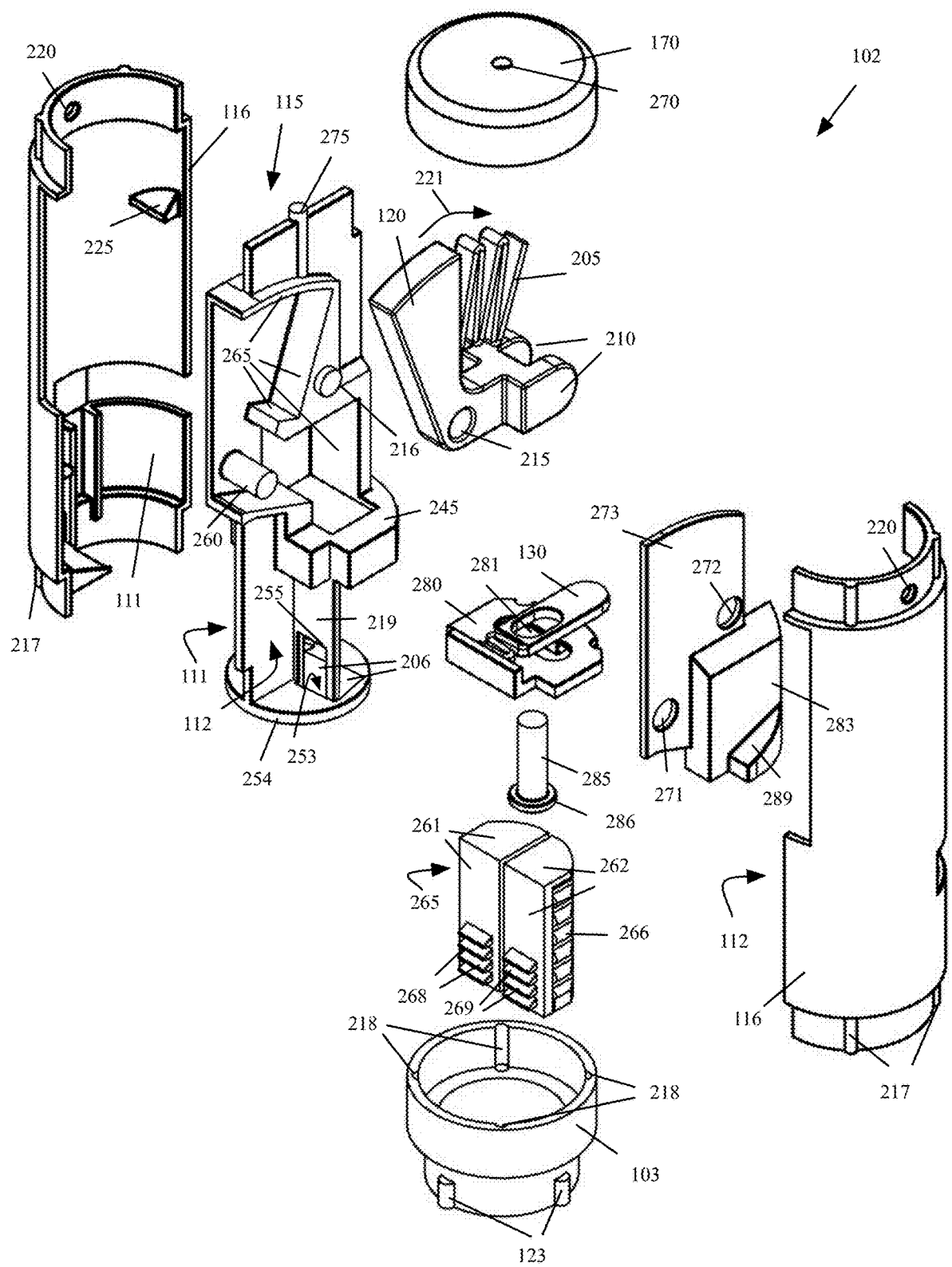
FIG. 2 is an expanded perspective view of the handle of FIGS. 1A-1C, according to various aspects of the present disclosure.

FIG. 2 is an expanded perspective view of the handle of FIGS. 1A-1C, according to various aspects of the present disclosure. With reference to FIG. 2, the connector 103 may include the set of tabs 123 to fit into a set of the matching grooves of the cooking utensil (not shown) by a twist and snap action.

With further reference to FIG. 2, the seasoning compartment 110 (FIGS. 1A-1C) may include one or more seasoning sections 111-112 (only two sections are shown in FIG. 2 for simplicity). The adjacent seasoning compartment sections 111-112 may be separated by a divider 115. The divider 115 may include the components 206, 219, 245, 254, 255, 265, 273, and 275, which are described below. The seasoning compartment sections 111-112 may be formed between the housing 116 of the seasoning compartment sections 111-112 and the divider 115. The housing 116 of the seasoning compartment sections 111-112 may include a set of tabs that may fit into a matching set of grooves on the connector 103. Further details of the seasoning compartment sections are described below.

In some embodiments, each of the plurality of seasoning compartment sections 111-112 may be filled with one or more grindable seasonings. In some embodiments, the handle 102 may be replaceable. Each seasoning compartment section of the replaceable handle may be pre-filled by one or more grindable seasonings and the handle may be sealed after the seasoning compartment section(s) is/are pre-filled. In some embodiments, once the pre-filled seasonings in a handle are grinded and dispensed, the handle may be discarded and may be replaced with another handle that is pre-filled with grindable seasonings.

The replaceable handle provides the technical advantage of allowing a quick replacement of one type of grindable seasoning with another type of grindable seasoning, depending on a particular cooking task. The pre-filled seasoning compartment sections provide the technical advantage of eliminating manual refill of seasoning compartment sections that may, at times, be messy and spill seasonings on the work area during the refill. The handle 102 may be quickly removed from the cooking utensil and be replaced by another handle by using the twist and snap tabs 123 on the connector 103.

Some embodiments may include replaceable seasoning cartridges (not shown) instead of replaceable handles. In these embodiments, the seasonings may be included in replaceable cartridges. Each replaceable cartridge may be pre-filled by one or more grindable seasonings and may be inserted into an empty seasoning compartment section of the handle. The replaceable seasoning cartridges provide the technical advantage of allowing a quick replacement of one type of grindable seasoning with another type of grindable seasoning, depending on a particular cooking task. The replaceable seasoning cartridges provide the technical advantage of eliminating manual refill of seasoning compartment sections that may, at times, be messy and spill seasonings on the work area during the refill. The handle 102, in some embodiments, may include quick release buttons to facilitate the removal and insertion of replaceable seasoning cartridges.

With continued reference to FIG. 2, the divider 115 may include the structure 265, which is the housing for the lever 120, the spring 205, and the pivot heads 210. The handle 102 may include one or more movable sliding members 261-262 that are configured to move independent of each other. Each sliding member 261-262 may be located in one of the seasoning compartment sections 111-112. Each sliding member 261-262 may include a plurality of grinding teeth (or serrations) 268-269, respectively, for grinding seasonings. The sliding member 262 may be installed behind (in the perspective view of FIG. 2) the slot 255. The base 154 of the divider 115 may include an opening 206 that may lead to a grinding chamber 253 (shown in FIG. 11) that is configured to allow the sliding member 262 to go up and down (in the depicted orientation) through the grinding chamber 253 when the lever 120 is pressed in the direction of the arrow 221 and then released. When the lever 120 is pressed, at least a portion of the lever 120 may move into the lever's housing 265. When the lever 120 is released, at least a portion of the lever 120 may move out of the lever's housing 265.

As described below with reference to FIG. 11, when the sliding member 262 goes up and down through the grinding chamber 253, the grinding teeth 269 may grind the seasonings. The seasoning may move from the seasoning compartment section 112, through the slot 255, into the grinding chamber 253 (shown in the expanded view 1150 of FIG. 11).

The plate 219 of the divider 115 and the sliding member 262 are configured to prevent the seasoning to enter from the seasoning compartment section 112 into the area where the spring 266 is located. The sliding member 261 may be installed behind another slot (not shown in the perspective view of FIG. 2) on the other side of the divider 115 (this slot 455 is shown in FIG. 4B).

The shut pin 285 fits in the opening 281 on the selector switch 130. The plate 280 supports the selector switch and keeps the selector switch 130 from moving up and down (in the depicted orientation). In operation, the selector switch 130 may move to one of a plurality of positions in order to select one of the plurality of seasoning compartment sections 111-112. By moving the selector switch 130 to one of the plurality of positions, the shut pin 285 may move over a corresponding sliding member 261-262. For example, when the handle has two seasoning compartment sections 111 and 112, and the selector switch 130 is moved to one of two positions to select the seasoning compartment section 111, the shut pin 285 is moved over the sliding members 261 in order to grind and dispense seasonings from the selected seasoning compartment section 111. In this example, when the selector switch 130 is moved to the other position to select the seasoning compartment section 112, the shut pin 285 is moved over the sliding member 262 in order to grind and dispense seasonings from the selected seasoning compartment section 112.

The lever 120 may then be pressed (i.e., pushed into the lever housing 265) and released one or more times to compress and stretch the spring 205, which is incorporated in the lever 120. The pivot shaft 260 fits into the opening 215 on the lever 120. When the lever 120 is pushed (in the direction of the arrow 221), the lever 120 rotates around the pivot shaft 260, causing the pivot heads 210 to move down in a circular motion. The pivot heads 210 rotate together and the pivot heads that is located above the shut pin 285 (according to the position of the selector switch 130 and the shut pin 285) presses against the shut pin and moves the shut pin 285 down.

It should be noted that, although FIG. 2 shows only two pivot heads 210, the handle 102 includes one pivot head 210 for each seasoning compartment section 111-112. For example, in an embodiments that the handle 102 includes n seasoning compartment sections (where n is an integer number), there may be n pivot heads 210, one per seasoning compartment section. Each pivot head 210 may be configured to be located substantially above (in the depicted orientation) the corresponding sliding member in order to push the shut pin 285 against the corresponding seasoning compartment section when the selector switch has moved the shut pin 285 between the pivot head and the sliding member and the lever 120 is pressed.

Depending on the position of the shut pin 285, the base 286 of the shut pin 285 either pushes the sliding member 261 or the sliding member 262 down, causing the grinding teeth 268 or 269 on the corresponding sliding member to come in contact with, and grind, the grindable seasonings in the selected seasoning compartment section 111 or 112. The grinded seasonings may be dispensed through one or more dispensing channels 145 and one or more dispensing holes 140 (FIG. 1C) located on the cooking utensil 101.

Each seasoning compartment section 111-112, in some embodiments, may include a compression spring 266-267 (in the perspective view of FIG. 2, the compression spring 267 is hidden behind the sliding member 261, the compression spring 267 is shown on FIG. 8B) to apply pressure to, and release pressure from, the sliding members 261-262. As described above, when the lever 120 is pressed, the shut pin 285 pushes down on one of the sliding members (e.g., the sliding member 262). The corresponding spring 266 is compressed as the sliding member 262 is pushed down. When the lever 120 is released, the shut pin 285 is no longer applies pressure to, or pushes down, the sliding member 262. As a result, the spring 266 is stretched and the sliding member 262 and the shut pin 285 are pushed up to their initial positions.

Figure 3:
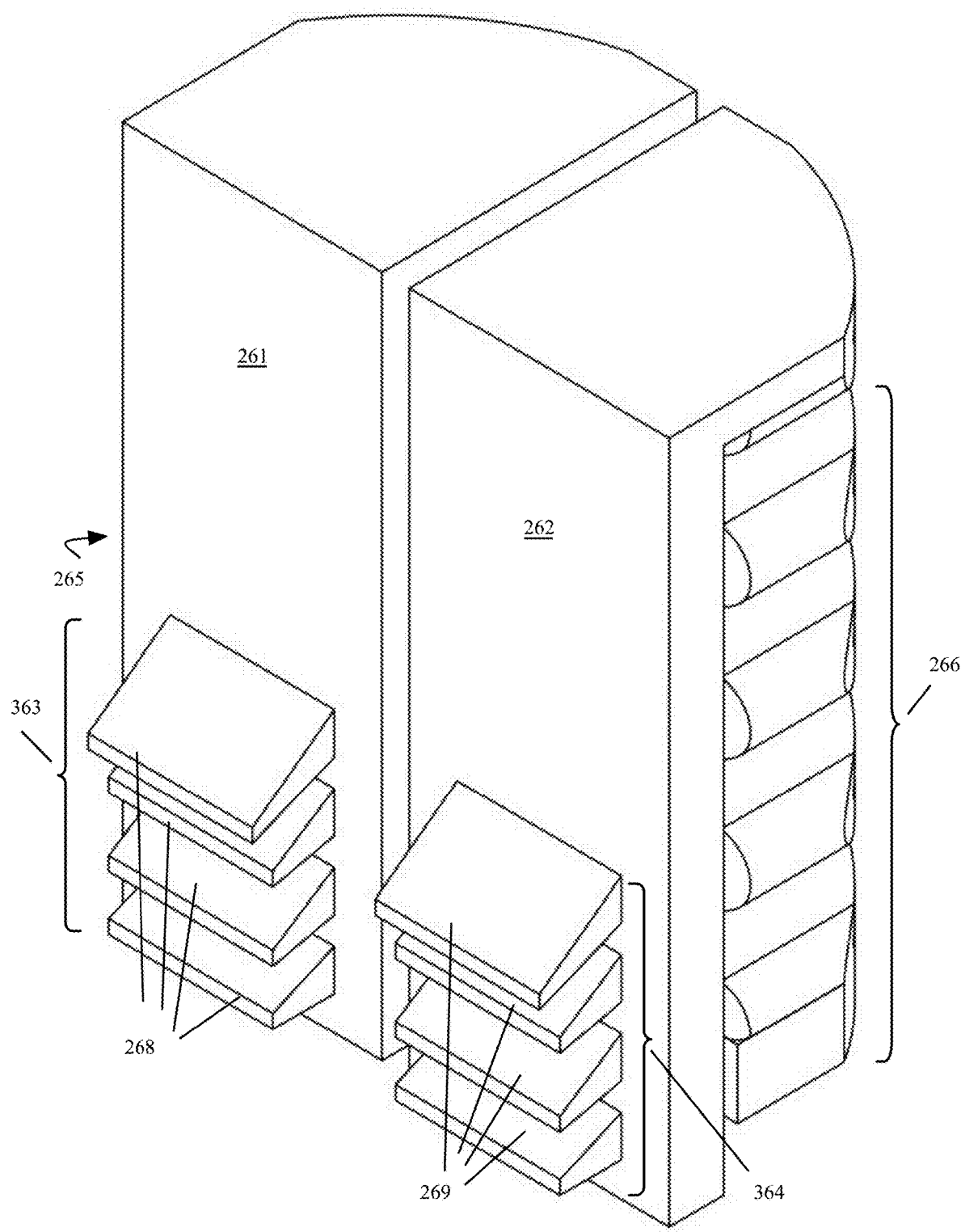
FIG. 3 is a side perspective view of the sliding members and the corresponding grinding surfaces of the handle of a cooking article, according to various aspects of the present disclosure.

FIG. 3 is a side perspective view of the sliding members and the corresponding grinding surfaces of the handle of a cooking article, according to various aspects of the present disclosure. With reference to FIG. 3. the sliding members 261 and 262 may move up and down (in the depicted orientation) independent of each other.

Each sliding member 261-262 may include a plurality of grinding teeth. In some embodiments, only a portion 363-364 of each sliding member 261-262 may include the grinding teeth 268-269, respectively. Each sliding member 261-262 may include a corresponding spring 266-267 (the spring 267 is not shown in the perspective view of FIG. 3).

Figure 4A:
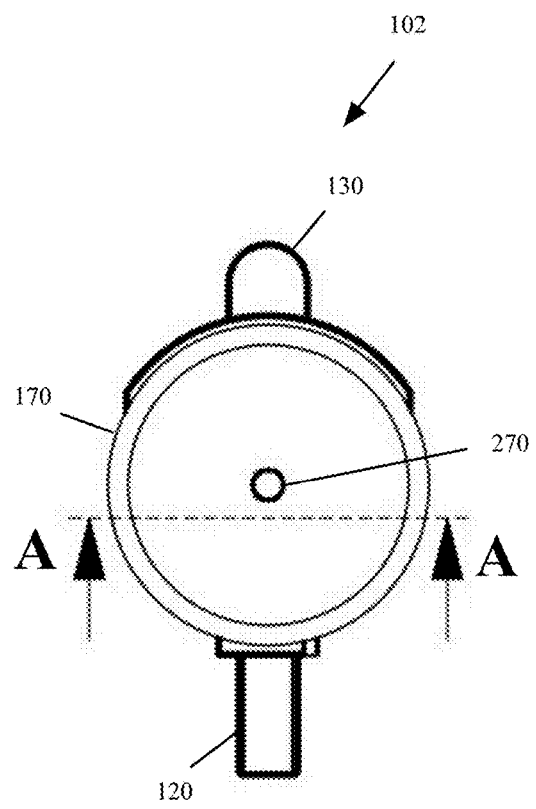
FIG. 4A is a top view and FIG. 4B is a cross section view of the handle of FIG. 2, according to various aspects of the present disclosure.
Figure 4B:
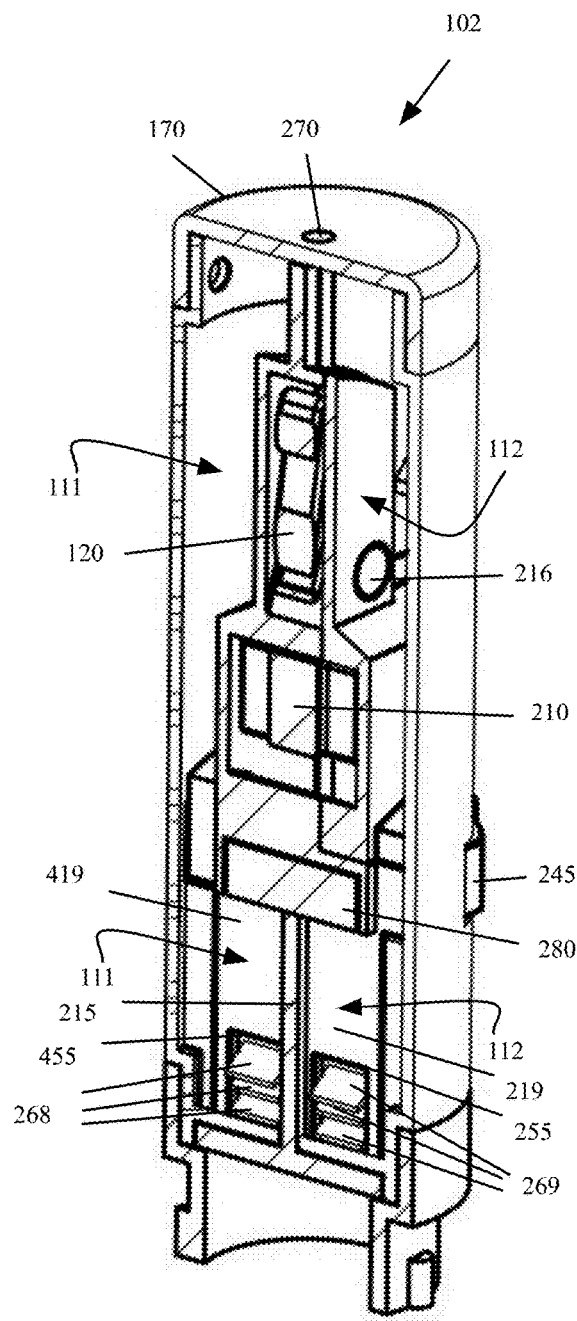

FIG. 4A is a top view and FIG. 4B is a cross section view of the handle of FIG. 2, according to various aspects of the present disclosure. FIG. 4B is the cross section view of the handle 102 along the line A-A shown in FIG. 4A. With reference to FIG. 4B, the plate 219 of the divider 115 includes the slot 255. The seasonings in the seasoning compartment section 112 (which in the depicted orientation is in front and right side of the handle 102) may pass through the slot 255 and come in contact with the grinding teeth 269. The plate 419 of the divider 115 includes the slot 455. The seasonings in the seasoning compartment section 111 (which in the depicted orientation is in front and left side of the handle 102) may pass through the slot 455 and come in contact with the grinding teeth 268.

Referring back to FIG. 2, the divider 115 may include the plate 245, which is configured to prevent the seasonings from entering into the opening 281. The divider 115 may include the plate 273, which covers the structure 265 to prevent the seasonings from coming into contact with the lever 120, the spring 205, and the pivot head 210. The structures 283 and 289 support the plate 273. Similar structures as the structures 283 and 289 are on the other side of the divider 115, which are not shown in the perspective view of FIG. 2 (these structures are shown as the structures 683 and 689 in FIGS. 6A-6B). The pivot 250 goes through the openings 215 and 271. The shaft 216 goes through the opening 272. The stop 225 is a structure that holds the divider 115 in place and prevents the divider 115 to spin around.

In some embodiments, the housing of the handle 102 may be made of transparent material (e.g., and without limitations, from transparent plastic material). These embodiments may include the openings 220 on the housing to allow spraying of painting and other chemicals for post processing. The openings 220 may also be used for hanging the handle by a hook during manufacturing to allow the paint to dry in the air. The openings 220 may not be visible from outside once the cap 170 is placed on the handle 102.

Some embodiments may include the optional opening 270 that may be used to lock the cap 170. The guide 275 may go through the opening 270 to keep the cap 170 in place. In the embodiments that the handle 102 is pre-filled with grindable seasonings and is discarded after the seasonings are dispensed, when the cap is placed on the handle's housing during manufacturing, the guide 275 may be permanently attached to the cap 170. For example, and without limitations, the guide 275 and the cap 170 may be attached together by adhesive, by plastic welding, etc. In these embodiments, the tabs 217 may also be permanently attached to the grooves 218 on the connector 103, for example, and without limitations, by adhesive, by plastic welding, etc.

In embodiments that the handle is not discarded after the seasonings are dispensed (e.g., when the handle includes replaceable seasoning cartridges), different components of the handle 103 may be separable for cleaning, replacement, and/or maintenance. For example, the end cap 170 may be removed, followed by other individual components shown in FIG. 2.

Figure 5A:
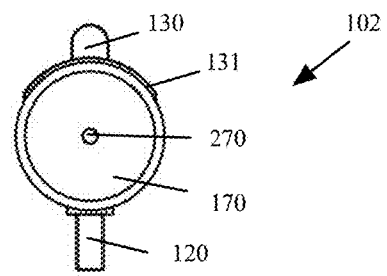
FIG. 5A is a top view.
Figures 5B, 5C, 5D, 5E:
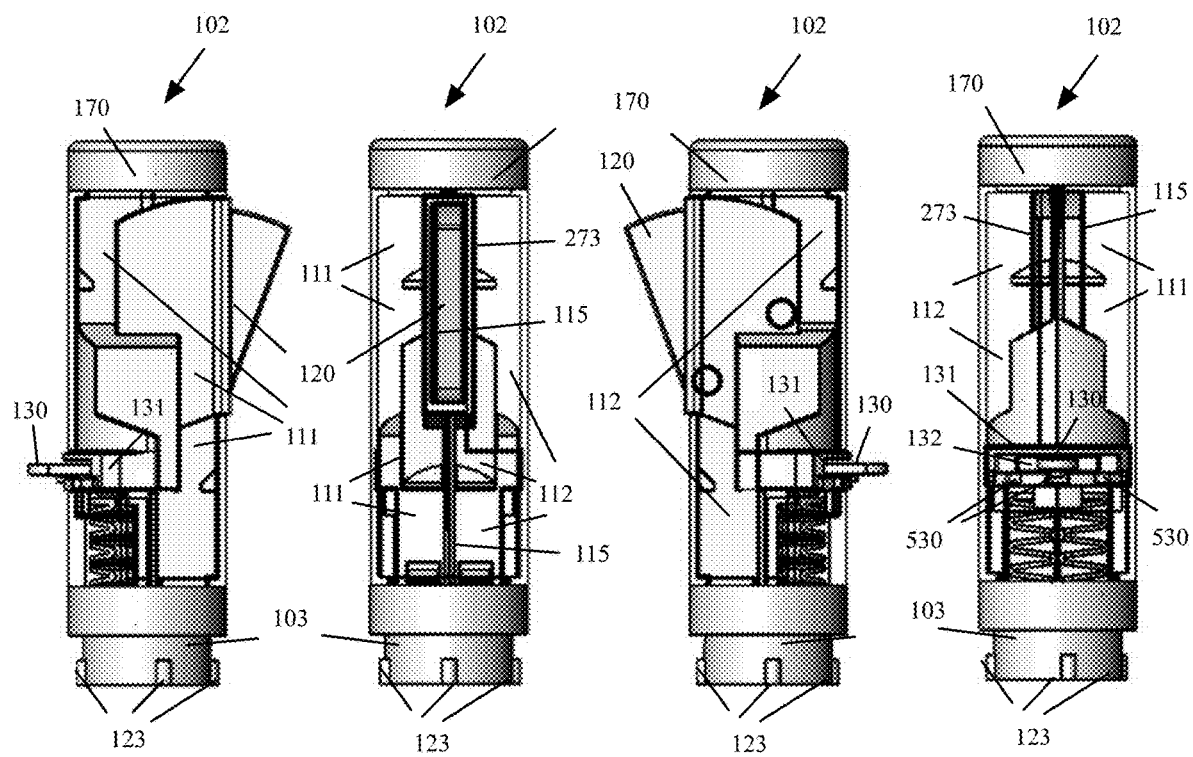
FIG. 5B is a left elevation view.
FIG. 5C is a front elevation view.
FIG. 5D is a right elevation view.
FIG. 5E is a back elevation view.
Figure 5F:
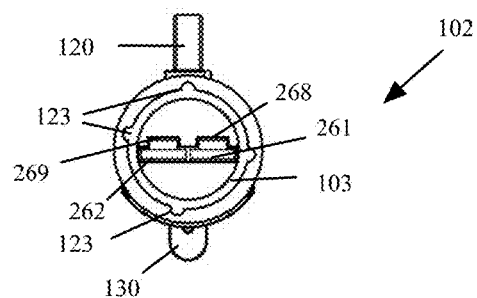
FIG. 5F is a bottom view of the handle of FIG. 2, according to various aspects of the present disclosure.

FIG. 5A is a top view, FIG. 5B is a left elevation view, FIG. 5C is a front elevation view, FIG. 5D is a right elevation view, FIG. 5E is a back elevation view, and FIG. 5F is a bottom view of the handle of FIG. 2, according to various aspects of the present disclosure. With reference to FIGS. 5A-5F, different views of the handle 102 of FIG. 2 are shown after the individual components are assembled together. In some embodiments, at least a portion of the housing of the handle 102 may be transparent, for example, to make the seasonings that are inside the handle visible.

As shown in FIGS. 5C and 5E, the divider 115 (including the divider's plate 273), separates the seasoning compartment sections 111 and 112. FIG. 5B shows the seasoning compartment section 111. All portions of the seasoning compartment section that are labeled 111 are connected together. FIG. 5D shows the seasoning compartment section 112. All portions of the seasoning compartment section that are labeled 112 are connected together.

As shown from the back elevation view of FIG. 5E, the selector switch's 130 housing 131 may include a plurality of stoppers 530 to hold the selector switch 130 in position after one of the plurality of seasoning compartment sections. Some embodiments may include a stopper to keep the selector switch 130 at a neutral position where none of the seasoning compartment sections are selected.

FIG. 5F shows a bottom view of the movable sliding members 261-262 and the grinding teeth 268 and 269. The movable sliding members 261-162 may move independently of each other. For example, in a handle with two seasoning compartment sections, when the selector switch 130 is moved to right (in the depicted view), the movable sliding member 261 and the grinding region 263 may move down and up when the lever 120 is pressed and released. When the selector switch 130 is on the left (in the depicted view), the movable sliding member 262 and the grinding region 264 may move down and up when the lever 120 is pressed and released.

Figures 6A, 6B:
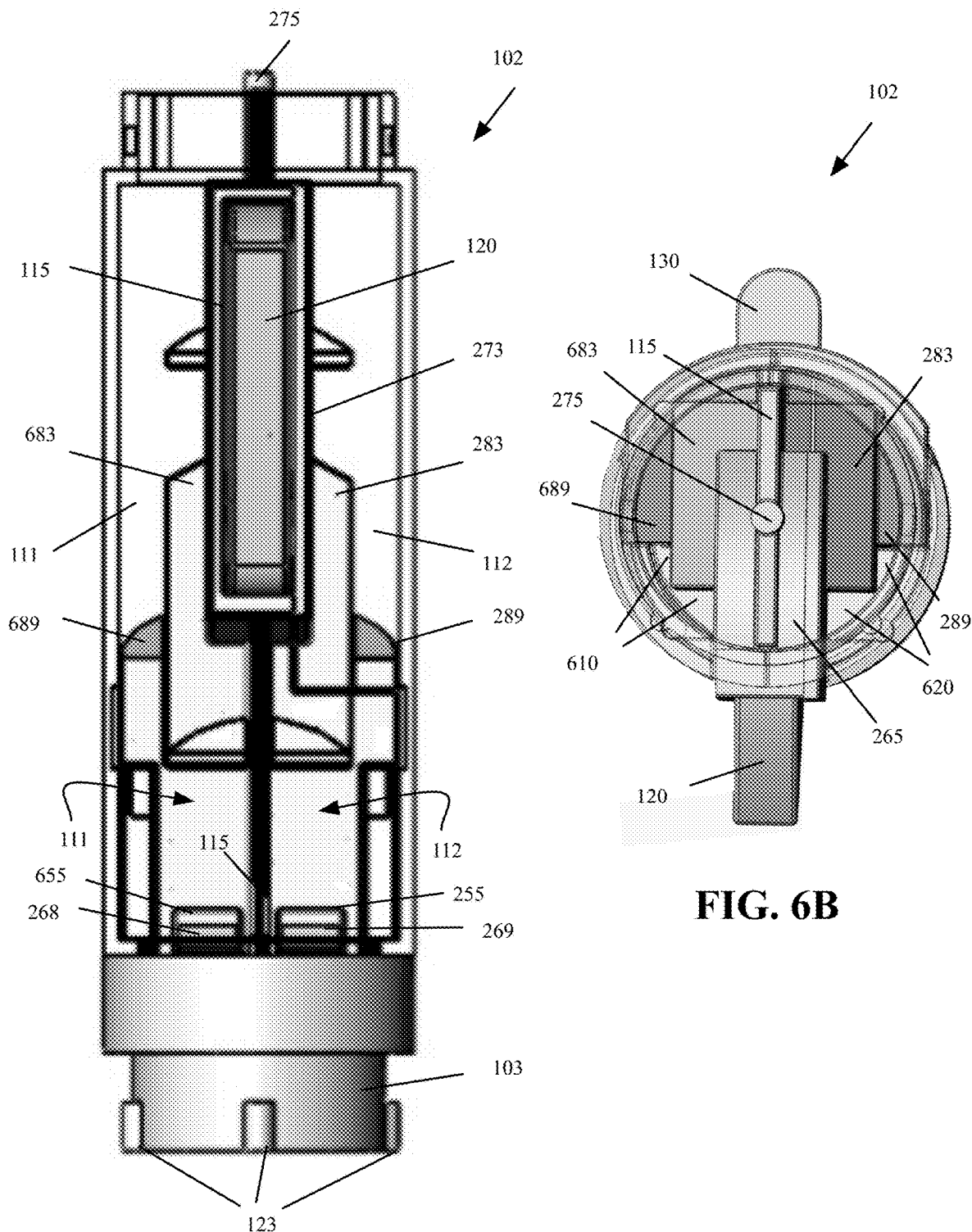
FIG. 6A is a front elevation view of the handle of a cooking article, according to various aspects of the present disclosure.
FIG. 6B is a top view of the handle of FIG. 6A, according to various aspects of the present disclosure.

FIG. 6A is a front elevation view of the handle of a cooking article, according to various aspects of the present disclosure. FIG. 6B is a top view of the handle of FIG. 6A, according to various aspects of the present disclosure. With reference to FIGS. 6A-6B, the cap 170 is not shown in order to show other components of the handle 102. The divider 115 (which includes the plate 273 and the structure 265) separates the two seasoning compartment sections 111 and 112 from each other. In FIGS. 6A and 6B, the seasoning compartment section 111 is located on the left of the divider 115 and the seasoning compartment section 112 is located on the right of the divider 115.

Different portions of the seasoning compartment section 111 in FIG. 6A (all labeled as 111) are connected together. Gaps such as 610 (FIG. 6B) may allow the seasonings to move in the seasoning compartment section 111 from the top of the handle (in the pictured view of FIG. 6A) to the bottom of the handle. The seasonings may enter the slot 655 and come in contact with the teeth 268.

Different portions of the seasoning compartment section 112 in FIG. 6A (all labeled 112) are connected together. Gaps such as 620 (FIG. 6B) may allow the seasoning to move in the seasoning compartment section 111 from the top of the handle (in the pictured view of FIG. 6A) to the bottom of the handle. The seasonings may enter the slot 255 and come in contact with the teeth 269.

Figure 7A:
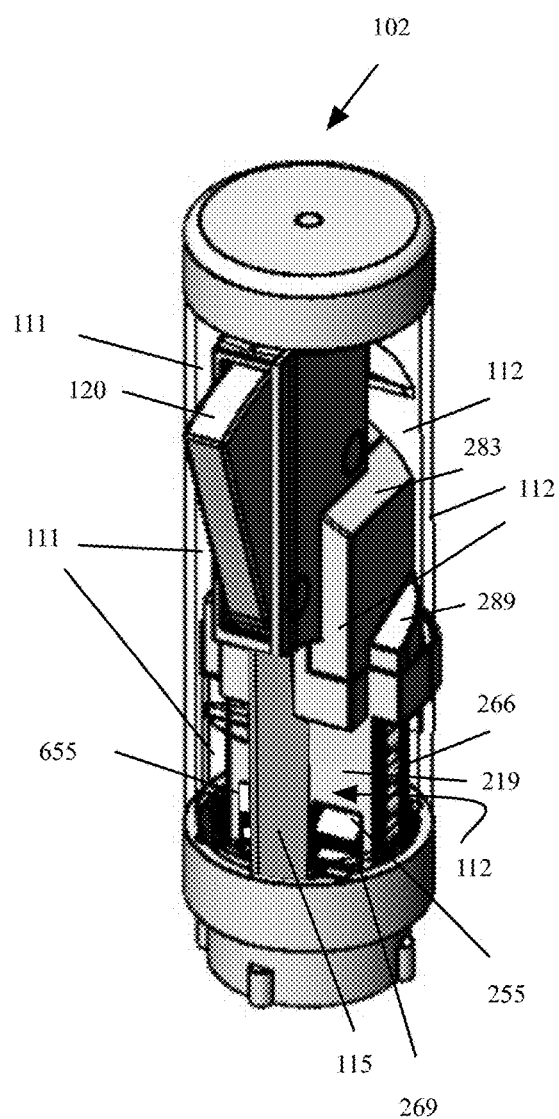
FIG. 7A is a front and right elevation view a of the handle of a cooking article showing the details of the seasoning compartment sections, according to various aspects of the present disclosure.
Figure 7B:
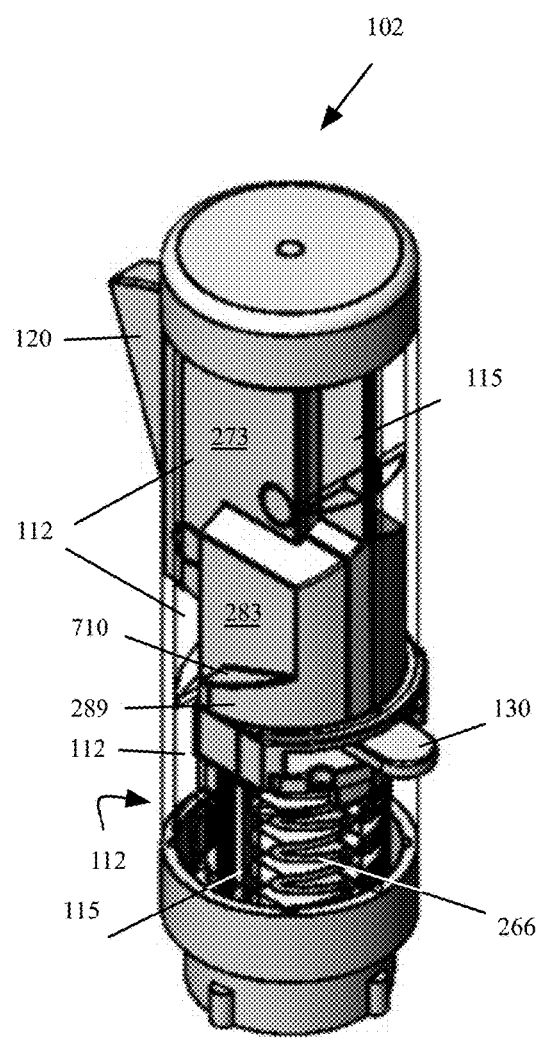
FIG. 7B is a right elevation view of the handle of FIG. 7A, showing the details of one of the seasoning compartment sections, according to various aspects of the present disclosure.

FIG. 7A is a front and right elevation view a of the handle of a cooking article showing the details of the seasoning compartment sections, according to various aspects of the present disclosure. FIG. 7B is a right elevation view of the handle of FIG. 7A, showing the details of one of the seasoning compartment sections, according to various aspects of the present disclosure.

With reference to FIGS. 7A-7B, the divider 115 (including the plate 219) is configured such that the seasonings in the seasoning compartment section 112 do not enter the area where the spring 266 is located. The sloped surface 710 of the structure 289 is configured to guide the downward (in the depicted orientation) movement of the seasonings from the upper areas of the seasoning compartment section 112 into the front and lower area of the seasoning compartment section 112.

Figure 8A:
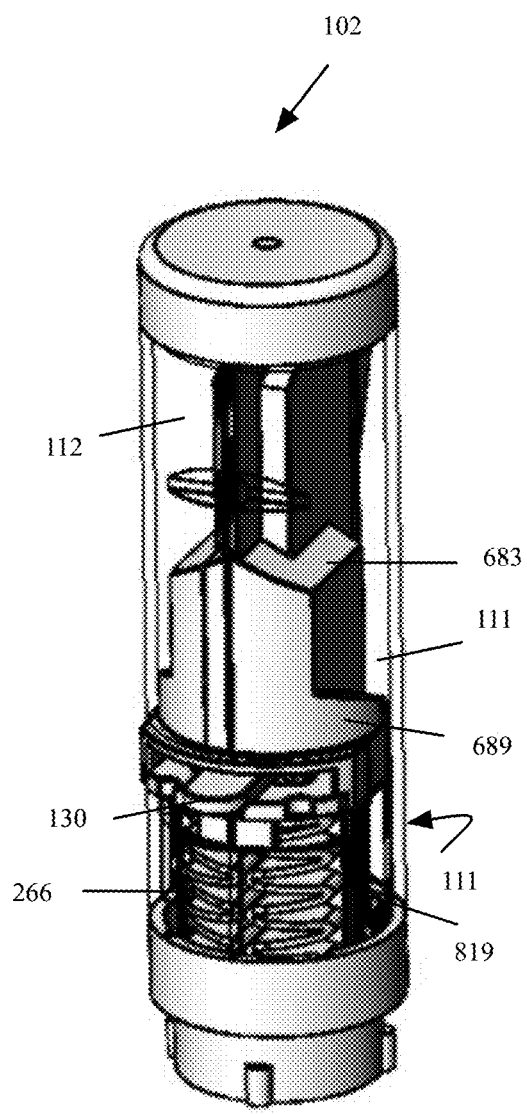
FIG. 8A is a back and left elevation view a of the handle of a cooking article showing the details of the seasoning compartment sections, according to various aspects of the present disclosure.
Figure 8B:
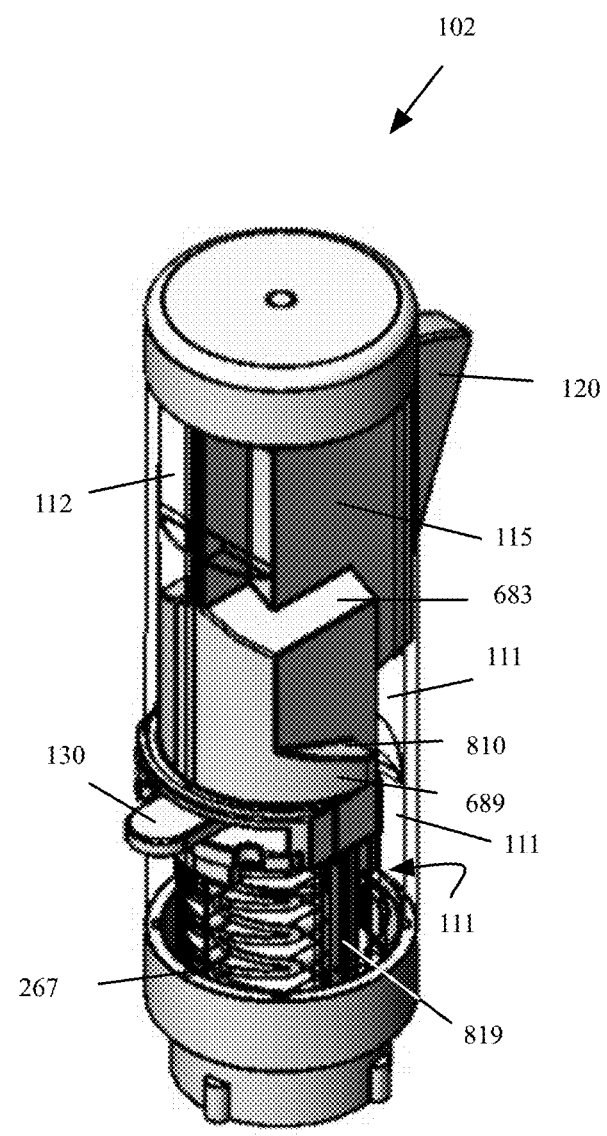
FIG. 8B is a back and left elevation view of the handle of FIG. 8A, showing the details of one of the seasoning compartment sections, according to various aspects of the present disclosure.

FIG. 8A is a back and left elevation view a of the handle of a cooking article showing the details of the seasoning compartment sections, according to various aspects of the present disclosure. FIG. 8B is a back and left elevation view of the handle of FIG. 8A, showing the details of one of the seasoning compartment sections, according to various aspects of the present disclosure.

With reference to FIGS. 8A-8B, the divider 115 (including the plate 819) is configured such that the seasonings in the seasoning compartment section 111 do not enter the area where the spring 267 is located. The sloped surface 810 of the structure 689 is configured to guide the downward (in the depicted orientation) movement of the seasonings from the upper areas of the seasoning compartment section 111 into the front and lower area of the seasoning compartment section 111.

FIG. 9A is the top view, FIG. 9B is a left elevation view, and FIGS. 9C-9D are cross section views of a cooking utensil handle showing the selector switch set to select a seasoning compartment sections for grinding and dispensing seasonings, according to various aspects of the present disclosure. FIG. 9C is the cross section view of the handle 102 along the line B-B shown in FIG. 9B. In the top view 9A, the handle 102 is rotated such that the selector switch 130 is located in the bottom (in the depicted orientation) in order to better visualize the position of the selector switch 130 in FIGS. 9A and 9C.

With reference to FIGS. 9A-9D, the selector switch 130 is set to a position to select the seasoning compartment section 112 for grinding and dispensing seasonings. As shown in FIG. 9C, the selector switch, in its current position, has moved the shut pin 285 such that the base 286 of the shut pin 285 is located on top of the sliding member 262 (in the cross section view of FIG. 9C, the sliding member 262 is located behind the spring 266). When the lever 120 is pushed in (as shown in FIG. 9D) and then released, the sliding member 262 and the grinding teeth 269 move up and down (in the depicted orientation) causing the seasonings in the seasoning compartment section 112 to come in contact with the grinding teeth 266 and be grinded.

Figure 10A:
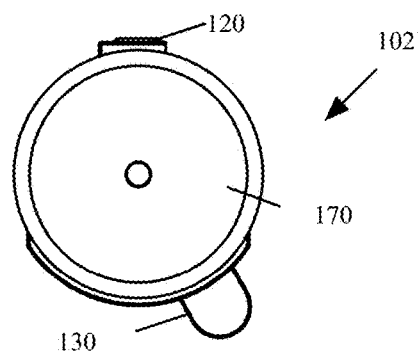
FIG. 10A is the top view.
Figure 10B:
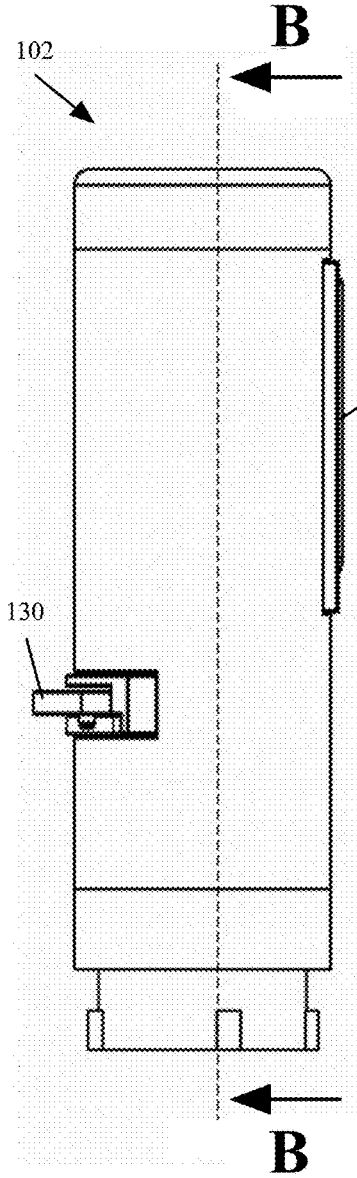
FIG. 10B is a left elevation view.
Figure 10C:
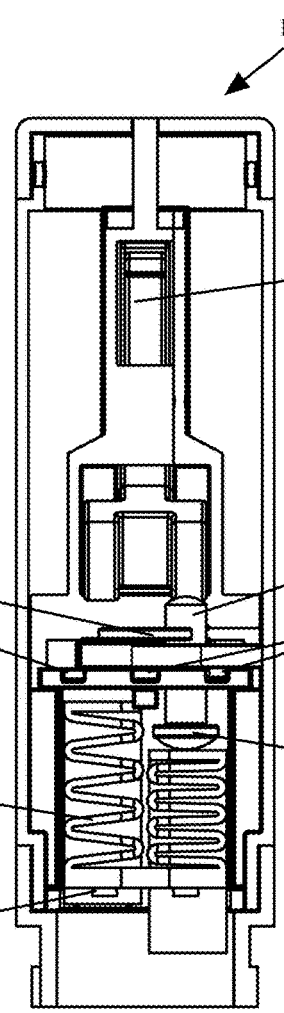
FIGS. 10C-10D are cross section views of the handle of FIGS. 9A-9D showing the selector switch set to select a different seasoning compartment sections for grinding and dispensing seasonings, according to various aspects of the present disclosure.
Figure 10D:
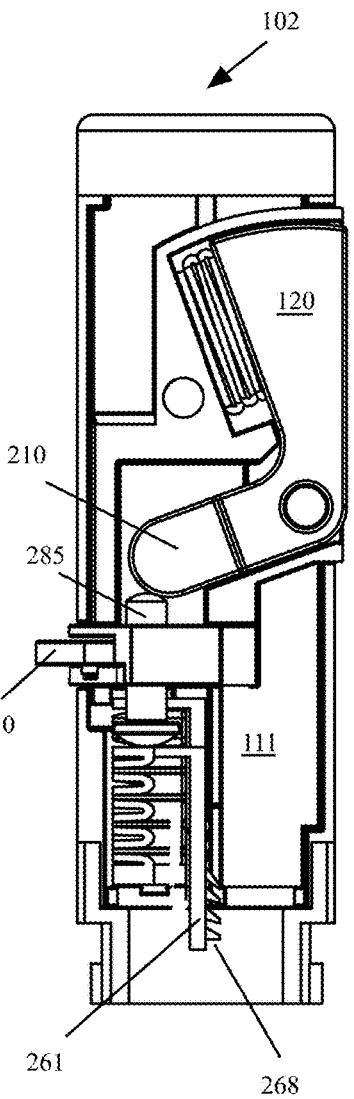

FIG. 10A is the top view, FIG. 10B is a left elevation view, and FIGS. 10C-10D are cross section views of the handle of FIGS. 9A-9D showing the selector switch set to select a different seasoning compartment sections for grinding and dispensing seasonings, according to various aspects of the present disclosure;

FIG. 10C is the cross section view of the handle 102 along the line B-B shown in FIG. 10B (which is the same as line B-B shown in FIG. 9B). In the top view 10A, the handle 102 is rotated such that the selector switch 130 is located in the bottom (in the depicted orientation) in order to better visualize the position of the selector switch 130 in FIGS. 10A and 10C.

With reference to FIGS. 10A-10D, the selector switch 130 is set to a position to select the seasoning compartment section 111 for grinding and dispensing seasonings. As shown in FIG. 10C, the selector switch, in its current position, has move the shut pin 285 such that the base 286 of the shut pin 285 is located on top of the sliding member 261 (in the cross section view of FIG. 10C, the sliding member 261 is located behind the spring 267). When the lever 120 is pushed in (as shown in FIG. 10D) and then released, the sliding member 261 and the grinding teeth 268 move up and down (in the depicted orientation) causing the seasonings in the seasoning compartment section 111 to come in contact with the grinding teeth 268 and be grinded.

Figure 11:
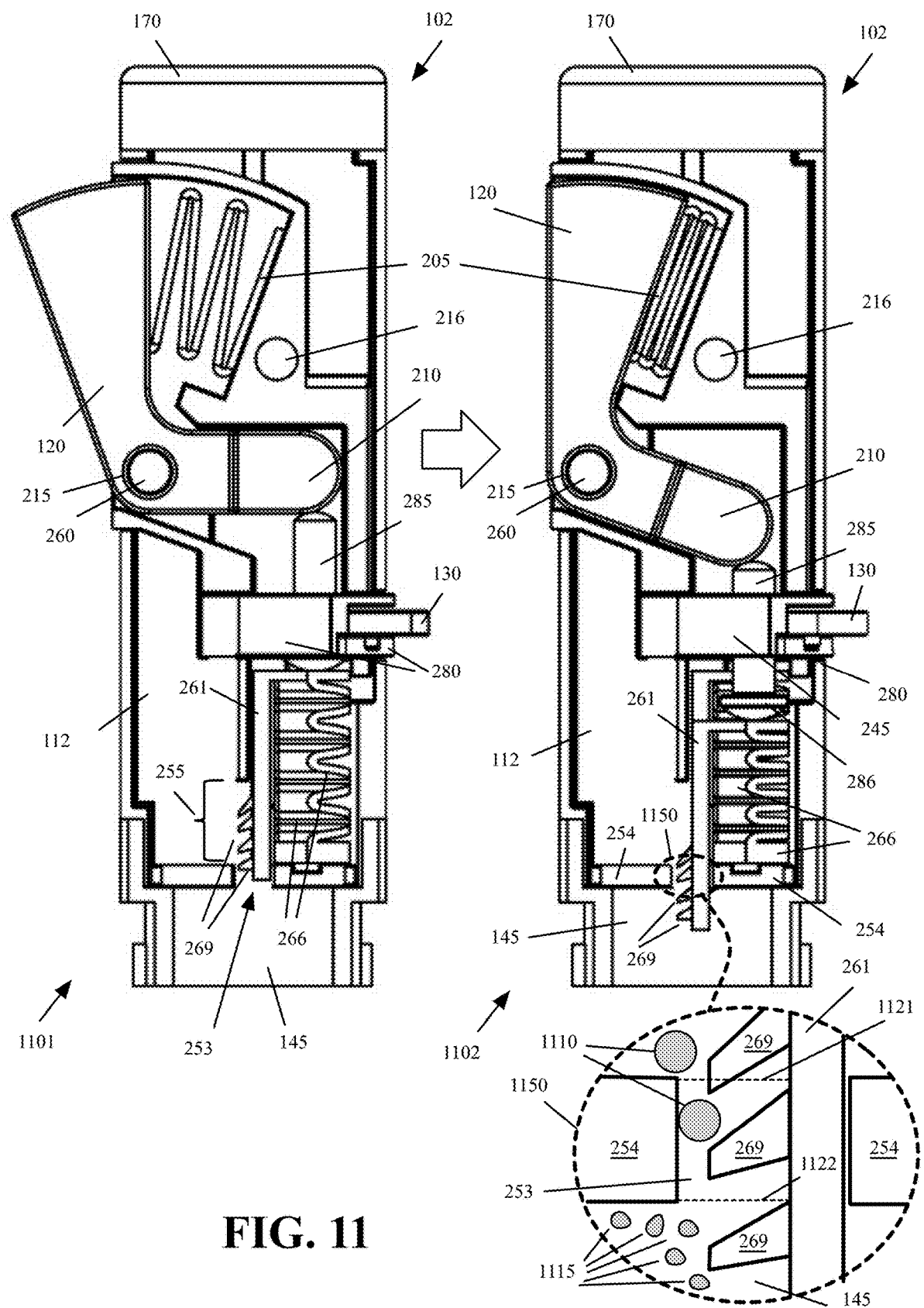
FIG. 11 is a cross section of the right elevation view of the handle of a cooking article, according to various aspects of the present disclosure.

FIG. 11 is a cross section of the right elevation view of the handle of a cooking article, according to various aspects of the present disclosure. FIG. 11 as shown, includes two operational stages 1101 and 1102. In the example of FIG. 11, it is assumed that the selector switch 130 is set to select the seasoning compartment section 112 for grinding and dispensing the seasonings filled in the seasoning compartment section 112. Some of the seasonings 1110 (shown in the expanded view 1150) in the seasoning compartment section 112 may pass through the slot 255, and come in contact with the grinding teeth 269.

In stage 1101, the lever 120 is released and the spring 205 is stretched. In stage 1101, the pivot head 210 is not applying any force to, and is not pushing down on, the shut pin 285.

In stage 1102, a force is applied to the lever 120 and the lever is pushed into the housing of the handle 102 and the spring 205 is compressed. In stage 1102, the lever 120 rotates around the pivot shaft 260, causing the pivot head 210 to move down. The pivot head 210 applies a force to, and moves, the shut pin 285 down.

Since the selector switch 130, in the example of FIG. 11, is set to select the seasoning compartment section 112, the base 286 of the shut pin 285 applies a force to the movable sliding member 262 causing the sliding member 262 to move down (in the depicted orientation) through the grinding chamber 253.

The grindable seasonings that pass through the slot 255 may go into the grinding chamber 253. As shown in the expanded view 1150, the grindable seasonings 1110 may enter the grinding chamber 253 through the opening 206 (FIG. 2) in the upper part (in the depicted orientation) of the grinding chamber 253. In the expanded view 1150, this opening is shown by the dashed line 206. As shown in the expanded view 1150, the grinding chamber 253 the area between base 254 of the divider 115 (FIG. 2) and the sliding member 261.

After entering the grinding chamber 253, the grindable seasonings 1110 may come in contact with the grinding teeth 269. As the sliding member 261 and the grinding teeth move up and down inside the grinding chamber 253 in response to the lever 120 being pushed in and released, the grinding teeth may grind the grindable seasonings 1110 into the smaller grinded seasonings 1115 (or the seasonings fragments). As the sliding member 261 moves up and down (in the depicted orientation) through the grinding chamber 253, the grinded seasonings 1115 are dropped into the dispensing channel 145 through the bottom opening of the grinding chamber 253. In the expanded view 1150, the bottom opening of the grinding chamber 253 is conceptually shown by the dashed line 1122.

The dispensing channel 145 may be a hollow channel. As described above with reference to FIG. 1C, a part of the dispensing channel 145 may be inside the handle 102 and a part of the dispensing channel 145 may be inside the cooking utensil 101. Both parts of the dispensing channel 145 become a continuous channel after the cooking utensil 101 and the handle are connected to each other.

In operation, the cooking spoon 101 (FIGS. 1A-1C) is connected to the handle 102 when the seasonings are grinded. The grinded seasonings 1115 may move downward (in the pictured orientation) and may be dispensed one or more dispensing openings 140 (FIG. 1C) located on the cooking utensil 101.

Figure 12:
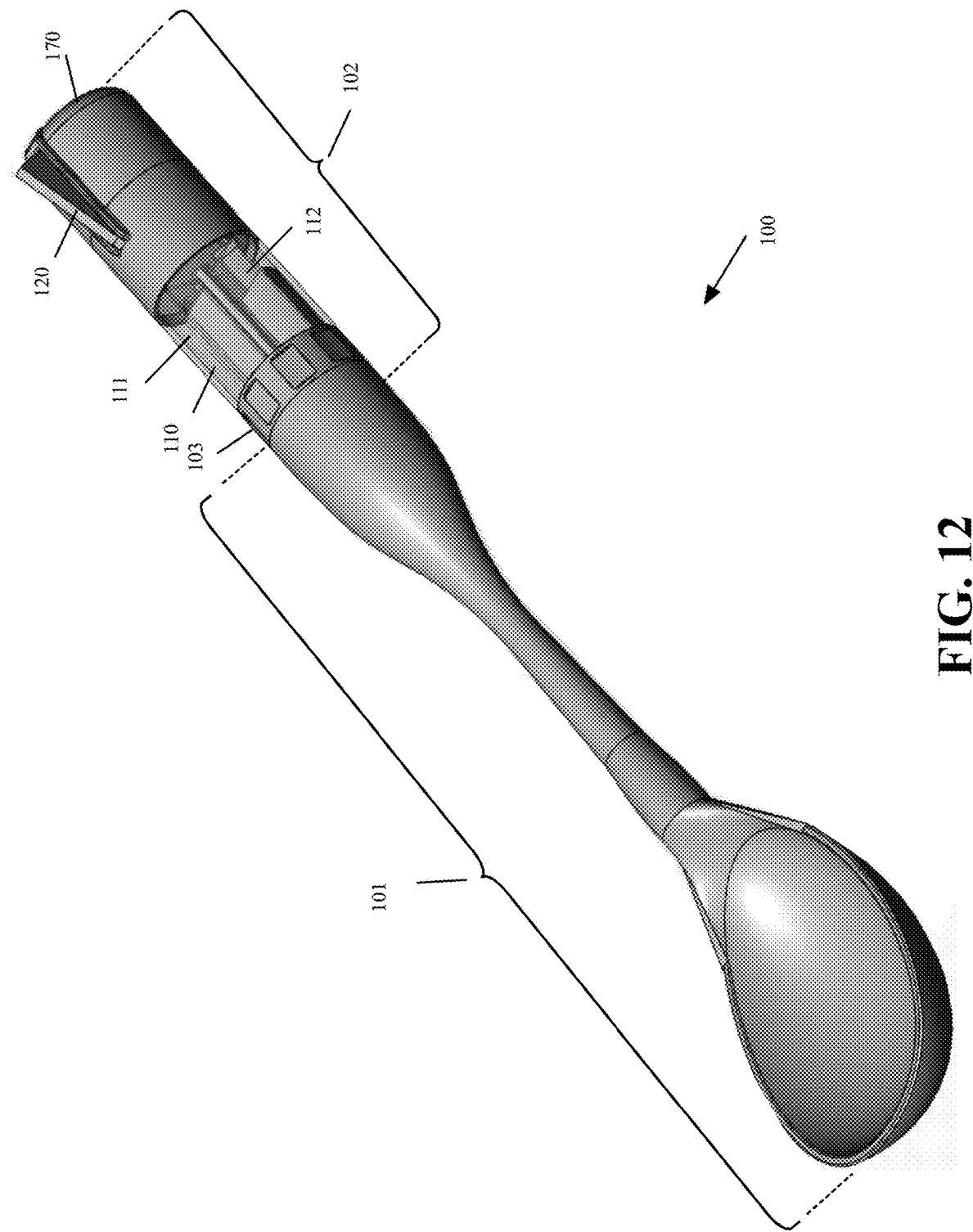
FIG. 12 is a front and side perspective view of a cooking utensil with integrated seasoning grinder, according to various aspects of the present disclosure.

Some embodiments may use a set of screw threads and matching grooves to connect the handle and the cooking utensil. FIG. 12 is a front and side perspective view of a cooking utensil with integrated seasoning grinder, according to various aspects of the present disclosure. With reference to FIG. 12, the cooking article 100 may include a cooking utensil 101 and a handle 102. The cooking utensil 101 and the handle 102 may be attached and detached by a connector 103. In the example embodiments of FIG. 12 the connector 103 is shown as a part of the handle 102. In other embodiments, the connector 103 may be a part of the cooking utensil 101. Yet, in other embodiments, the connector 103 may be a separate component that may be removably attached to the cooking utensil 101 on one side and removably attached to the handle 102 on the other side.

Figure 13:
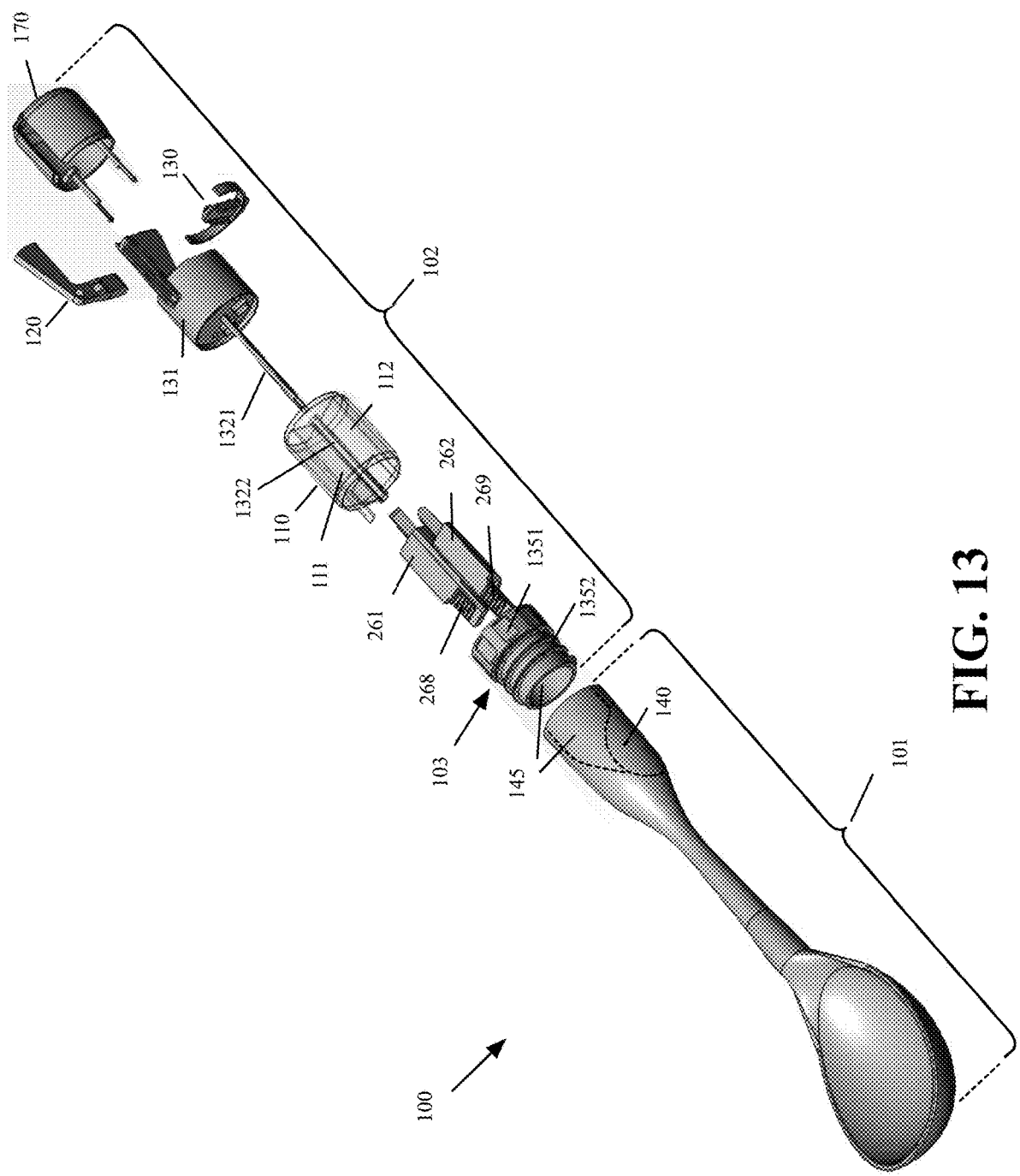
FIG. 13 is an expanded perspective view of the cooking utensil with integrated seasoning grinder of FIG. 12, according to various aspects of the present disclosure.

FIG. 13 is an expanded perspective view of the cooking utensil with integrated seasoning grinder of FIG. 12, according to various aspects of the present disclosure. With reference to FIG. 13, the connector 103 may include a screw thread 1352 and the cooking utensil 101 may include a matching groove (not shown). Alternatively, the connector 103 may include the groove and the cooking utensil 101 may include the screw thread. The connector 103, in some embodiments, may include one or more tabs 1351 to facilitate the rotation of the connector 103.

With further reference to FIG. 13, seasoning compartment 110 may include one or more seasoning compartment sections 111-112. In some embodiments, each section may be filled with one or more grindable seasonings. In some embodiments, the seasonings may be included in replaceable cartridges. Each replaceable cartridge may be pre-filled by one or more grindable seasonings and may be inserted into an empty seasoning compartment section.

With continued reference to FIG. 13, the handle 102 may include one or more movable sliding members 261-262. Each sliding member 261-262 may be inserted in one of the seasoning compartment sections 111-112. Each sliding member 261-262 may include a set of corresponding grinding serrations (or teeth) 268-269 for grinding seasonings.

In operation, the selector switch 130 may be set to select one of the plurality of seasoning compartment sections 111-112. The lever 120 may then be pressed and released one or more times. Based on the position of the selector switch 130, the lever 120 may be connected by one or more shafts 1321-1322 to one of the sliding member 261-262.

Pressing and releasing the lever 120 may cause the lever 120 to move the shafts 1321-1322 up and down. The shafts 1321-1322 may in turn move the sliding member in the selected seasoning compartment section up and down in order to grind the grindable seasonings that are in the selected seasoning compartment section 111-112 against the corresponding grinding teeth 268-269. Each seasoning compartment section 111-112, in some embodiments, may include a compression spring to apply and release pressure to the grinding teeth 268-269. The grinded seasoning may be dispensed through one or more dispensing holes 140.

Figure 14:
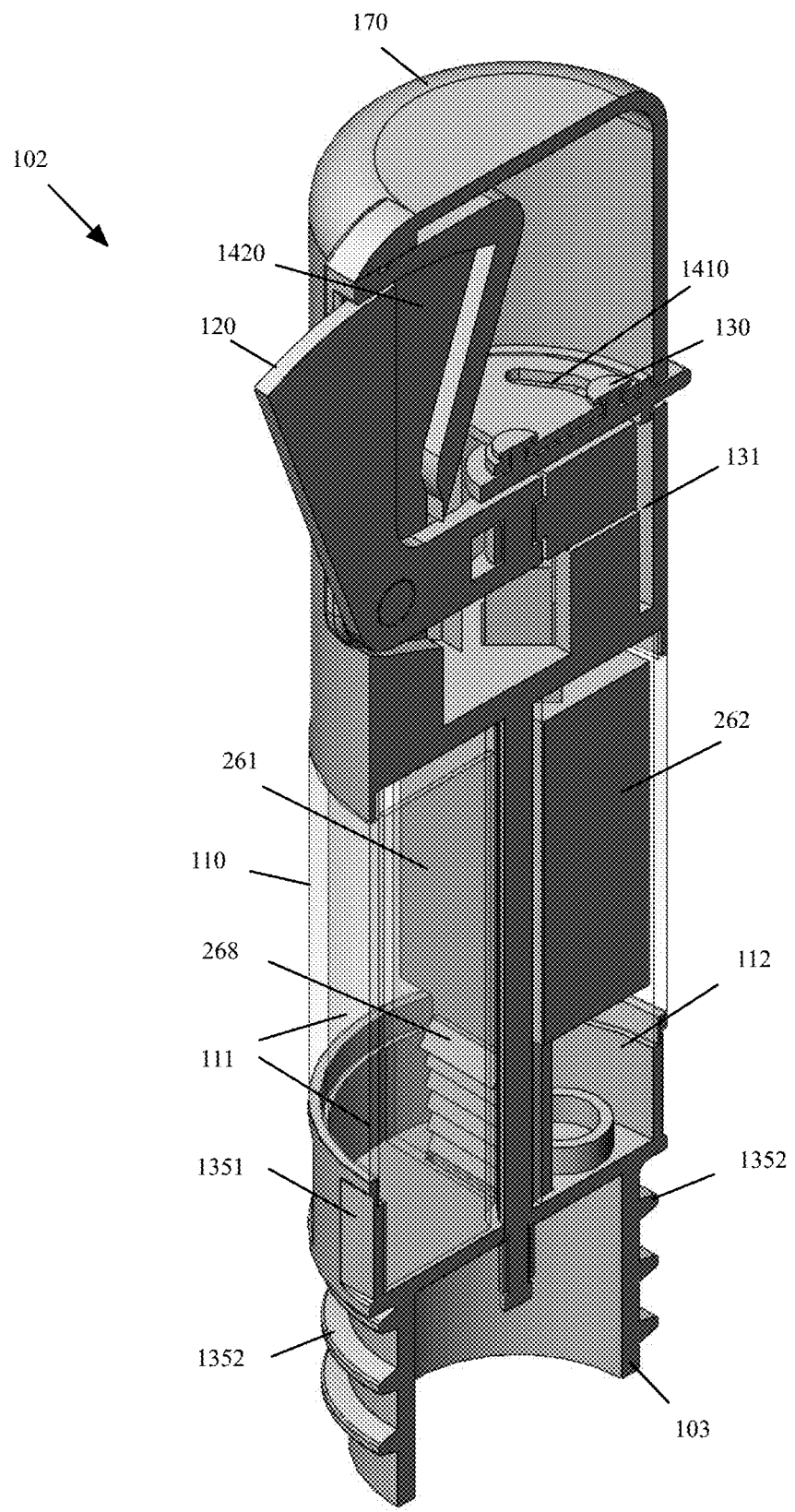
FIG. 14 is a cross sectional perspective view of a portion of the handle of FIGS. 12 and 13, according to various aspects of the present disclosure.
Figure 15:
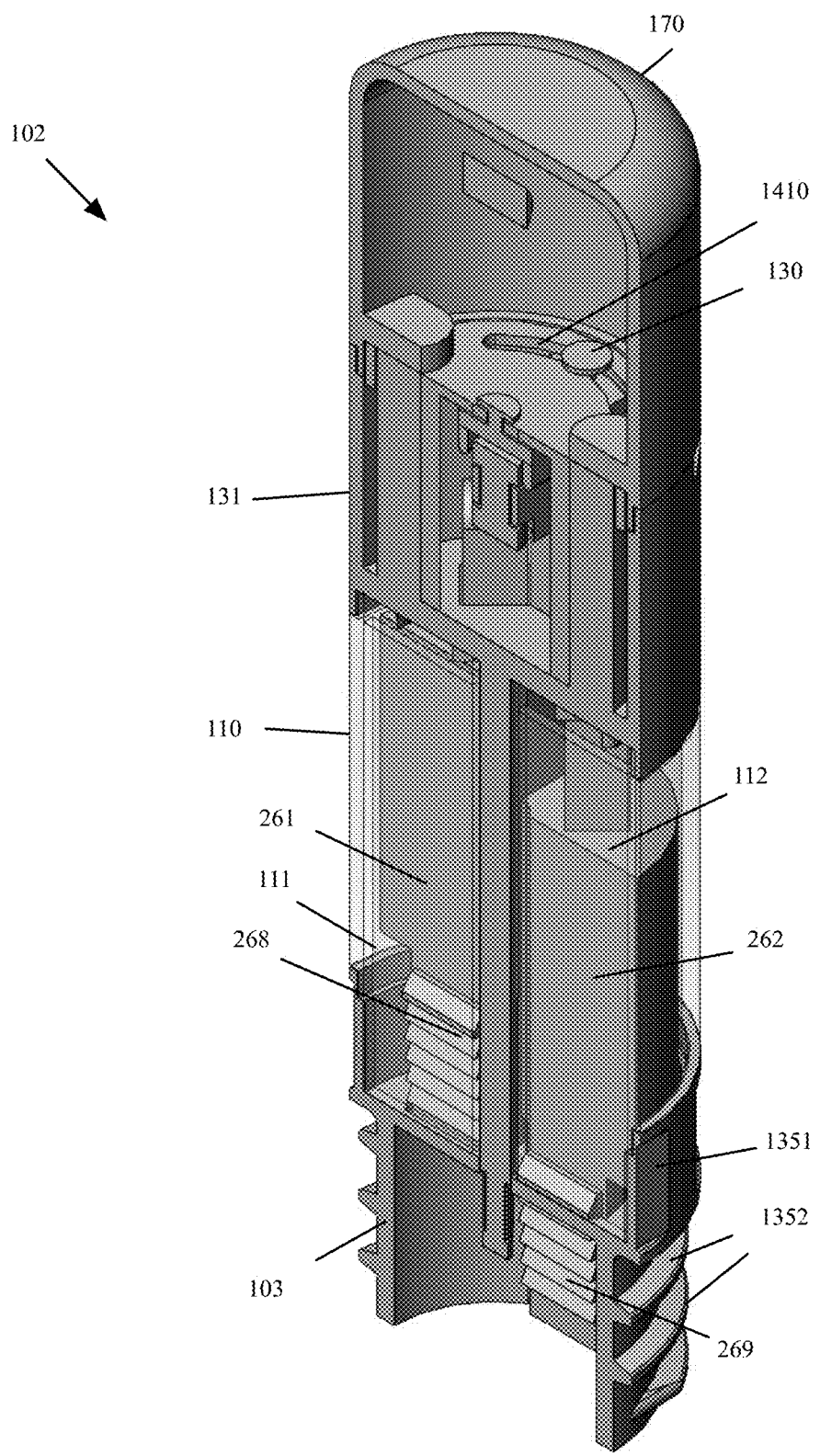
FIG. 15 is a cross sectional perspective view of a portion of a grinder of FIG. 14, according to various aspects of the present disclosure.

FIG. 14 is a cross sectional perspective view of a portion of the handle of FIGS. 12 and 13, according to various aspects of the present disclosure. FIG. 15 is a cross sectional perspective view of a portion of a grinder of FIG. 14, according to various aspects of the present disclosure.

With reference to FIGS. 14 and 15, the selector switch 130 may be movable inside a groove 1410. In the example of FIGS. 14 and 15, the selector switch may have been placed at a position to select the seasoning compartment section 112. Each seasoning compartment section 111-112, in some embodiments, may be filled with one or more grindable seasonings. Alternatively, each seasoning compartment section 111-112, in some embodiments, may include a replaceable cartridge that may include one or more grindable seasonings.

With reference to FIG. 14, the lever 120 may be hand operated and may be moved in and out of a space 1420. Pressing and releasing of the lever 120 may move the movable sliding member 262, which is selected by the selector switch 130, up and down. As shown in FIG. 15, the movable sliding member 262 and the corresponding grinding teeth 269 have moved down, causing the serrations on the grinding surface 164 to grind the grindable seasonings (not shown) that may be in the seasoning compartment section 112. The grinded seasonings may be dispensed through one or more dispensing channels 145 and one or more dispensing openings 140. In FIG. 13, only one dispensing channel and one dispensing hole are displayed.

In a first aspect, a cooking article is provided. The cooking article comprises a cooking utensil; and a handle removably connected to the cooking utensil, the handle comprises: a plurality of hollow seasoning compartment sections, each seasoning compartment section configured to store a quantity of grindable seasonings; a selector switch configured to select one of the plurality of seasoning compartment sections for grinding and dispensing seasonings; a plurality of sliding members, each sliding member associated with a corresponding seasoning compartment section, each sliding member comprising a set of one or more grinding teeth configured to grind the grindable seasonings of the associated seasoning compartment section; and a lever configured to be pressed and released, wherein when the lever is pressed and released, the lever moves the sliding member associated with the selected seasoning compartment section back and forth, causing the sliding member's set of grinding teeth to grind the grindable seasonings in the selected seasoning compartment section.

In an embodiment of the first aspect, the selector switch comprises an opening, the handle comprises: a shut pin configured to pass through the selector switch's opening; and a plurality of pivot heads connected to the lever, each pivot head in the plurality of pivot heads corresponding to a sliding member in the plurality of sliding members, and wherein when the selector switch selects a seasoning compartment section, the selector switch moves the shut pin between the seasoning compartment section's sliding member and the corresponding pivot head.

In another embodiment of the first aspect, the handle comprises a plurality of sliding member springs, each sliding member spring associated with a corresponding sliding member, each sliding member spring configured to compress when the associated sliding member is under pressure and moves in a first direction, each sliding member spring configured to stretch and move the associated sliding member in a second, opposite, direction when the sliding member is not under pressure, wherein when the lever is pressed and the shut pin is between a first pivot head and an associated first sliding member, the lever rotates the plurality of pivot heads, causing the first pivot head and the shut pin to move the first sliding member from a first position to a second position and causing the sliding member's spring to stretch; and wherein when the lever is released, and the shut pin is between the first pivot head and the first sliding member, the sliding member's spring stretches, causing the sliding member to move back to the first position, wherein said back and forth movement of the sliding member between the first and second positions causes the grindable seasonings in the selected seasoning compartment section to be grinded.

In another embodiment of the first aspect, each seasoning compartment section comprises a plate configured to prevent the grindable seasonings to come into contact with the seasoning compartment section's sliding member spring.

In another embodiment of the first aspect, the handle comprises a spring connected to the lever, wherein when the lever is pressed, the lever moves from a first position to a second position causing the spring to compress; and wherein when the lever released, the spring stretches and cause the handle to return to the first position.

In another embodiment of the first aspect, wherein the lever comprises an opening; wherein the handle comprises a pivot shaft configured to pass through the opening of the lever; and wherein when the lever is pressed and released, the lever rotates around the pivot shaft.

In another embodiment of the first aspect, each seasoning compartment section comprises a corresponding grinding chamber configured to receive a quantity of grindable seasonings from the corresponding seasoning compartment section, each grinding chamber configured to allow the sliding member of the corresponding seasoning compartment section to move across the grinding chamber causing the sliding member's set of grinding teeth to grind the grindable seasoning in the grinding chamber.

In another embodiment of the first aspect, each grinding chamber comprises an opening into a dispensing channel configured to dispense the grinded seasonings through one or more holes on the cooking utensil.

In another embodiment of the first aspect, the cooking utensil comprises a set of one or more seasoning dispensing holes configured to dispense the grinded seasonings.

An embodiment of the first aspect further comprises a hollow dispensing channel configured to transfer the grinded seasonings from the seasoning compartment sections to the set of dispensing holes, wherein a first section of the dispensing channel is located inside the handle and a second section of the dispensing channel is located inside the cooking utensil.

In another embodiment of the first aspect, the handle comprises a housing for the lever, wherein when the lever is pressed, at least a portion of the lever moves inside the lever's housing, and wherein when the lever is released, at least a portion of the lever moves out of the lever's housing.

In another embodiment of the first aspect, the handle comprises a plurality of stoppers configured to hold the selector switch in position after one of the plurality of seasoning compartment sections is selected.

An embodiment of the first aspect further comprises a seasoning compartment encompassing the plurality of seasoning compartment sections.

In another embodiment of the first aspect, an exterior surface of the seasoning compartment comprises a transparent material configured to show at least a portion of a content of each seasoning compartment section.

In another embodiment of the first aspect, one of the cooking utensil and the handle comprises a connector and a set of one or more tabs, wherein the other of the cooking utensil and the handle comprises a set of corresponding matching grooves, wherein the tabs are configured to fit inside the corresponding grooves, wherein the tabs are configured to lock inside the corresponding grooves when the handle is turned in a first direction against the cooking utensil, and wherein the tabs are configured to unlock from the corresponding grooves when the handle is turned in a second direction against the cooking utensil.

In another embodiment of the first aspect, one of the cooking utensil and the handle comprises a screw thread and the other of the cooking utensil and the handle comprises a matching groove, and wherein the cooking utensil and the handle are configured to attach and detach through the screw thread and the matching groove.

In another embodiment of the first aspect, each pair of adjacent seasoning compartment sections is separated by a divider configured to prevent the grindable seasonings stored in each seasoning compartment section in an adjacent pair to enter the other seasoning compartment section in the pair.

In another embodiment of the first aspect, the cooking utensil comprises one of a spoon, a slotted spoon, a fork, a spatula, a ladle, a spaghetti ladle, a whisk, a potato masher, a skimmer, a basting brush, and a tong.

In another embodiment of the first aspect, the handle is configured to attach to and detach from a plurality of different types of cooking utensils comprising spoons, slotted spoons, forks, spatulas, ladles, spaghetti ladles, whisks, potato mashers, skimmers, basting brushes, and tongs.

In another embodiment of the first aspect, the cooking utensil and the handle are made of one or more of plastic, metal, glass, silicone, nylon, wood, and ceramic.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure.

What is claimed is:

1. A cooking article, comprising:
   a cooking utensil; and
   a handle removably connected to the cooking utensil, the handle comprising:
   a plurality of hollow seasoning compartment sections, each seasoning compartment section configured to store a quantity of grindable seasonings;
   a selector switch configured to select one of the plurality of seasoning compartment sections for grinding and dispensing seasonings;
   a plurality of sliding members, each sliding member associated with a corresponding seasoning compartment section in the plurality of seasoning compartment sections, each sliding member comprising a set of one or more grinding teeth configured to grind the grindable seasonings of the associated seasoning compartment section; and
   a lever configured to be pressed and released, wherein when the lever is pressed and released, the lever moves the sliding member associated with the selected seasoning compartment section back and forth, causing the set of grinding teeth of the sliding member associated with the selected seasoning compartment section to grind the grindable seasonings in the selected seasoning compartment section.

2. The cooking article of claim 1,
   wherein the selector switch comprises an opening,
   wherein the handle comprises:
   a shut pin configured to pass through the opening of the selector switch; and
   a plurality of pivot heads connected to the lever, each pivot head in the plurality of pivot heads corresponding to a sliding member in the plurality of sliding members, and
   wherein when the selector switch selects a seasoning compartment section in the plurality of seasoning compartment sections, the selector switch moves the shut pin between the selected seasoning compartment section's sliding member and the corresponding pivot head.

3. The cooking article of claim 2,
   wherein the handle comprises a plurality of sliding member springs, each sliding member spring of the plurality of sliding member springs associated with a corresponding sliding member in the plurality of sliding members, each sliding member spring in the plurality of sliding member springs configured to compress when the associated sliding member is under pressure and moves in a first direction, each sliding member spring in the plurality of sliding member springs configured to stretch and move the associated sliding member in a second, opposite, direction when the sliding member is not under pressure,
- wherein when the lever is pressed and the shut pin is between a first pivot head and an associated first sliding member, the lever rotates the plurality of pivot heads, causing the first pivot head and the shut pin to move the first sliding member from a first position to a second position and causing the sliding member's spring to stretch; and
- wherein when the lever is released, and the shut pin is between the first pivot head and the first sliding member, the sliding member's spring stretches, causing the sliding member to move back to the first position, wherein said back and forth movement of the sliding member between the first and second positions causes the grindable seasonings in the selected seasoning compartment section to be grinded.

4. The cooking article of claim 3, wherein each seasoning compartment section in the plurality of seasoning compartment sections comprises a plate configured to prevent the grindable seasonings to come into contact with the seasoning compartment section's sliding member spring.

5. The cooking article of claim 1,
- wherein the handle comprises a spring connected to the lever,
- wherein when the lever is pressed, the lever moves from a first position to a second position causing the spring to compress; and
- wherein when the lever released, the spring stretches and cause the handle to return to the first position.

6. The cooking article of claim 1,
- wherein the lever comprises an opening;
- wherein the handle comprises a pivot shaft configured to pass through the opening of the lever; and
- wherein when the lever is pressed and released, the lever rotates around the pivot shaft.

7. The cooking article of claim 1, wherein each seasoning compartment section in the plurality of seasoning compartment sections comprises a corresponding grinding chamber configured to receive a quantity of grindable seasonings from the corresponding seasoning compartment section, each grinding chamber configured to allow the sliding member of the corresponding seasoning compartment section to move across the grinding chamber causing the sliding member's set of grinding teeth to grind the grindable seasoning in the grinding chamber.

8. The cooking article of claim 7, wherein each grinding chamber comprises an opening into a dispensing channel configured to dispense the grinded seasonings through one or more holes on the cooking utensil.

9. The cooking article of claim 1, wherein the cooking utensil comprises a set of one or more seasoning dispensing holes configured to dispense the grinded seasonings.

10. The cooking article of claim 9 further comprising a hollow dispensing channel configured to transfer the grinded seasonings from the seasoning compartment sections to the set of dispensing holes, wherein a first section of the dispensing channel is located inside the handle and a second section of the dispensing channel is located inside the cooking utensil.

11. The cooking article of claim 1, wherein the handle comprises a housing for the lever, wherein when the lever is pressed, at least a portion of the lever moves inside the lever's housing, and wherein when the lever is released, at least a portion of the lever moves out of the lever's housing.

12. The cooking article of claim 1, wherein the handle comprises a plurality of stoppers configured to hold the selector switch in position after one of the plurality of seasoning compartment sections is selected.

13. The cooking article of claim 1 further comprising a seasoning compartment encompassing the plurality of seasoning compartment sections.

14. The cooking article of claim 13, wherein an exterior surface of the seasoning compartment comprises a transparent material configured to show at least a portion of a content of each seasoning compartment section in the plurality of seasoning compartment sections.

15. The cooking article of claim 1, wherein one of the cooking utensil and the handle comprises a connector and a set of one or more tabs, wherein the other of the cooking utensil and the handle comprises a set of corresponding matching grooves, wherein the tabs are configured to fit inside the corresponding grooves, wherein the tabs are configured to lock inside the corresponding grooves when the handle is turned in a first direction against the cooking utensil, and wherein the tabs are configured to unlock from the corresponding grooves when the handle is turned in a second direction against the cooking utensil.

16. The cooking article of claim 1, wherein one of the cooking utensil and the handle comprises a screw thread and the other of the cooking utensil and the handle comprises a matching groove, and wherein the cooking utensil and the handle are configured to attach and detach through the screw thread and the matching groove.

17. The cooking article of claim 1, wherein each pair of adjacent seasoning compartment sections is separated by a divider configured to prevent the grindable seasonings stored in each seasoning compartment section in an adjacent pair to enter the other seasoning compartment section in the pair.

18. The cooking article of claim 1, wherein the cooking utensil comprises one of a spoon, a slotted spoon, a fork, a spatula, a ladle, a spaghetti ladle, a whisk, a potato masher, a skimmer, a basting brush, and a tong.

19. The cooking article of claim 1, wherein the handle is configured to attach to and detach from a plurality of different types of cooking utensils comprising spoons, slotted spoons, forks, spatulas, ladles, spaghetti ladles, whisks, potato mashers, skimmers, basting brushes, and tongs.

20. The cooking article of claim 1, wherein the cooking utensil and the handle are made of one or more of plastic, metal, glass, silicone, nylon, wood, and ceramic.

* * * * *